US012183970B2

(12) United States Patent
Hollenbeck et al.

(10) Patent No.: US 12,183,970 B2
(45) Date of Patent: Dec. 31, 2024

(54) INTEGRATED BALANCING RADIATING ELEMENTS

(71) Applicant: Optisys, Inc., West Jordan, UT (US)

(72) Inventors: Michael Hollenbeck, West Jordan, UT (US); Robert Smith, West Jordan, UT (US)

(73) Assignee: Optisys, Inc., Salt Lake City, UT (US)

( * ) Notice: Subject to any disclaimer, the term of this patent is extended or adjusted under 35 U.S.C. 154(b) by 485 days.

(21) Appl. No.: 17/515,217

(22) Filed: Oct. 29, 2021

(65) Prior Publication Data

US 2022/0140477 A1 May 5, 2022

Related U.S. Application Data

(60) Provisional application No. 63/107,304, filed on Oct. 29, 2020.

(51) Int. Cl.
*H01Q 1/46* (2006.01)
*H01P 3/06* (2006.01)
*H01Q 1/48* (2006.01)

(52) U.S. Cl.
CPC ................. *H01Q 1/46* (2013.01); *H01P 3/06* (2013.01); *H01Q 1/48* (2013.01)

(58) Field of Classification Search
CPC ............... H01Q 1/46; H01Q 1/48; H01P 3/06
See application file for complete search history.

(56) References Cited

U.S. PATENT DOCUMENTS 2,819,451 A 1/1958 Sims
3,286,202 A 11/1966 Daveau
3,432,716 A 3/1969 Suzuki et al.
3,777,286 A 12/1973 Cramm et al.
4,297,658 A 10/1981 Treczka et al.
4,467,294 A 8/1984 Janky et al.
4,473,828 A 9/1984 Morz et al.
4,504,805 A 3/1985 Ekelman et al.
4,743,915 A 5/1988 Rammos et al.
4,783,663 A 11/1988 Rammos et al.
(Continued)

FOREIGN PATENT DOCUMENTS

EP 3093921 A1 11/2016
FR 3087954 A1 10/2018
(Continued)

OTHER PUBLICATIONS

Machine translation prepared on Jan. 12, 2024, by Google Patents for Publication No. WO 2017208153 (https://patents.google.com/patent/WO2017208153A1/en?oq=WO2017208153).
(Continued)

*Primary Examiner* — Junpeng Chen

(74) *Attorney, Agent, or Firm* — TechLaw Ventures, PLLC; Terrence J. Edwards

(57) ABSTRACT

Waveguides, transitions, and conductors for propagating electromagnetic energy. An assembly includes a waveguide transition device comprising two or more coaxial waveguides. The assembly includes a radiating component comprising two or more radiating elements configured to receive or transmit electromagnetic energy through two or more signal ears, wherein each of the two or more signal ears is in communication with a coaxial waveguide of the two or more coaxial waveguides.

24 Claims, 23 Drawing Sheets

(56) References Cited

U.S. PATENT DOCUMENTS

| | | | |
|---|---|---|---|
| 4,952,894 A | 8/1990 | Connerney et al. | |
| 5,243,357 A | 9/1993 | Koike et al. | |
| 5,274,839 A | 12/1993 | Kularajah et al. | |
| 5,291,650 A | 3/1994 | Carvalho et al. | |
| 5,329,285 A | 7/1994 | McCandless | |
| 6,018,315 A | 1/2000 | Ince et al. | |
| 6,137,450 A | 10/2000 | Bhattacharyya et al. | |
| 6,198,730 B1 | 3/2001 | Hogberg et al. | |
| 6,201,508 B1 | 3/2001 | Metzen et al. | |
| 6,211,813 B1 | 4/2001 | Dousset et al. | |
| 6,297,774 B1 | 10/2001 | Chung | |
| 6,356,241 B1 | 3/2002 | Jaeger et al. | |
| 6,411,174 B1 | 6/2002 | Crouch et al. | |
| 6,501,434 B1 | 12/2002 | Hollenstein et al. | |
| 6,563,398 B1 | 5/2003 | Wu | |
| 6,839,029 B2 | 1/2005 | Mendolia et al. | |
| 7,480,435 B2 | 1/2009 | Brist et al. | |
| 7,564,421 B1 | 7/2009 | Edwards et al. | |
| 7,750,763 B2 | 7/2010 | Praβmayer et al. | |
| 8,026,859 B2 | 9/2011 | McLean | |
| 8,537,068 B2 | 9/2013 | Martin et al. | |
| 8,988,294 B2 | 3/2015 | Voss et al. | |
| 9,065,163 B1 | 6/2015 | Wu et al. | |
| 9,112,255 B1 | 8/2015 | Hollenbeck et al. | |
| 9,142,872 B1 | 9/2015 | Izadian | |
| 9,253,925 B1 | 2/2016 | Smith | |
| 9,257,753 B2 | 2/2016 | Milroy et al. | |
| 9,343,795 B1 | 5/2016 | Halligan et al. | |
| 9,369,259 B2 | 6/2016 | Mohamadi | |
| 9,450,308 B1 | 9/2016 | Lewis, Jr. | |
| 9,537,212 B2 | 1/2017 | Rosen et al. | |
| 9,559,428 B1 | 1/2017 | Jensen et al. | |
| 9,728,862 B2 | 8/2017 | Choi et al. | |
| 9,742,069 B1 | 8/2017 | Hollenbeck et al. | |
| 9,859,597 B2 | 1/2018 | Jensen et al. | |
| 9,960,495 B1 | 5/2018 | Hollenbeck et al. | |
| 9,991,605 B2 | 6/2018 | Elsallal et al. | |
| 10,020,554 B2 | 7/2018 | Parekh et al. | |
| 10,027,030 B2 | 7/2018 | Boryssenko et al. | |
| 10,056,699 B2 | 8/2018 | Elsallal et al. | |
| 10,170,833 B1 | 1/2019 | Hollenbeck et al. | |
| 10,181,645 B1 | 1/2019 | Klein et al. | |
| 10,333,230 B2 | 6/2019 | Elsallal et al. | |
| 10,340,606 B2 | 7/2019 | Elsallal et al. | |
| 10,468,773 B2 | 11/2019 | Hollenbeck et al. | |
| 10,481,253 B1 | 11/2019 | Hollenbeck et al. | |
| 10,680,341 B1 | 6/2020 | Anderson et al. | |
| 10,840,605 B2 | 11/2020 | Hollenbeck et al. | |
| 10,854,993 B2 | 12/2020 | Franzini et al. | |
| 10,886,625 B2 | 1/2021 | Franzini et al. | |
| 11,128,034 B2 | 9/2021 | Hollenbeck et al. | |
| 11,211,680 B2 | 12/2021 | Hollenbeck et al. | |
| 11,233,304 B2 | 1/2022 | Hollenbeck et al. | |
| 11,670,868 B2 | 6/2023 | Franzini et al. | |
| 12,009,596 B2 | 6/2024 | Hollenbeck et al. | |
| 2001/0033207 A1* | 10/2001 | Anderson | H01P 3/00<br>333/99 PL |
| 2003/0174096 A1 | 9/2003 | Mendolia et al. | |
| 2004/0263290 A1 | 12/2004 | Sherrer et al. | |
| 2006/0226931 A1 | 10/2006 | Hozouri | |
| 2008/0018420 A1 | 1/2008 | Prassmayer et al. | |
| 2008/0308289 A1 | 12/2008 | Archambeault et al. | |
| 2009/0206473 A1 | 8/2009 | Lopez et al. | |
| 2010/0033391 A1 | 2/2010 | McLean | |
| 2010/0060391 A1 | 3/2010 | Ristola et al. | |
| 2010/0141543 A1 | 6/2010 | Parekh et al. | |
| 2010/0188304 A1 | 7/2010 | Clymer et al. | |
| 2010/0259346 A1 | 10/2010 | Runyon | |
| 2011/0267250 A1 | 11/2011 | Seifried et al. | |
| 2012/0025928 A1 | 2/2012 | Crouch | |
| 2012/0062335 A1 | 3/2012 | Sherrer et al. | |
| 2013/0033404 A1 | 2/2013 | Abe | |
| 2013/0141186 A1 | 6/2013 | Nguyen et al. | |
| 2013/0154764 A1 | 6/2013 | Lawson et al. | |
| 2013/0241670 A1 | 9/2013 | Mikhemar et al. | |
| 2013/0321089 A1 | 12/2013 | Ohashi et al. | |
| 2014/0285291 A1 | 9/2014 | Payne et al. | |
| 2014/0347144 A1 | 11/2014 | Nath et al. | |
| 2015/0001762 A1 | 1/2015 | Lacaze et al. | |
| 2015/0119045 A1 | 4/2015 | Montgomery et al. | |
| 2015/0123862 A1 | 5/2015 | Milroy et al. | |
| 2015/0123867 A1 | 5/2015 | Legay et al. | |
| 2015/0130665 A1 | 5/2015 | Lacaze et al. | |
| 2015/0180111 A1 | 6/2015 | Runyon et al. | |
| 2015/0200462 A1 | 7/2015 | Leppaluoto | |
| 2015/0229460 A1 | 8/2015 | Mohamadi | |
| 2015/0270616 A1 | 9/2015 | Jafarlou et al. | |
| 2015/0340752 A1 | 11/2015 | Nantista et al. | |
| 2016/0036113 A1 | 2/2016 | Wu et al. | |
| 2016/0141754 A1 | 5/2016 | Leyh et al. | |
| 2016/0254579 A1 | 9/2016 | Mills | |
| 2016/0351984 A1 | 12/2016 | Jensen et al. | |
| 2017/0047661 A1 | 2/2017 | Parekh et al. | |
| 2017/0077610 A1 | 3/2017 | Bongard et al. | |
| 2017/0117637 A1 | 4/2017 | Jensen et al. | |
| 2017/0256864 A1 | 9/2017 | Jensen et al. | |
| 2017/0263991 A1 | 9/2017 | Jensen et al. | |
| 2017/0302003 A1 | 10/2017 | Elsallal et al. | |
| 2018/0090815 A1 | 3/2018 | Shirinfar et al. | |
| 2018/0219277 A1 | 8/2018 | Hirata et al. | |
| 2019/0089035 A1 | 3/2019 | Takahashi | |
| 2019/0089058 A1 | 3/2019 | Klein et al. | |
| 2019/0190111 A1 | 6/2019 | Hollenbeck et al. | |
| 2019/0190160 A1 | 6/2019 | Hollenbeck et al. | |
| 2019/0190161 A1 | 6/2019 | Hollenbeck et al. | |
| 2019/0312327 A1 | 10/2019 | Kitt | |
| 2019/0318848 A1 | 10/2019 | Gundel | |
| 2019/0334252 A1 | 10/2019 | Adam et al. | |
| 2020/0006865 A1 | 1/2020 | Adada et al. | |
| 2020/0076066 A1 | 3/2020 | Hollenbeck et al. | |
| 2020/0127358 A1 | 4/2020 | De Rijk et al. | |
| 2020/0161735 A1* | 5/2020 | Kamo | H01P 5/08 |
| 2020/0161738 A1 | 5/2020 | de Rijk et al. | |
| 2020/0194855 A1 | 6/2020 | Hollenbeck et al. | |
| 2020/0194860 A1 | 6/2020 | Hollenbeck et al. | |
| 2020/0266510 A1 | 8/2020 | Gomez et al. | |
| 2021/0013612 A1 | 1/2021 | Baldauf et al. | |
| 2021/0013623 A1 | 1/2021 | Wang | |
| 2021/0111691 A1 | 4/2021 | Xie et al. | |
| 2021/0126332 A1 | 4/2021 | Uemichi | |
| 2022/0045420 A1 | 2/2022 | Hollenbeck et al. | |
| 2022/0123477 A1 | 4/2022 | Hollenbeck et al. | |
| 2022/0190456 A1 | 6/2022 | Hollenbeck et al. | |
| 2022/0368000 A1 | 11/2022 | Hollenbeck et al. | |
| 2022/0368026 A1 | 11/2022 | Hollenbeck et al. | |

FOREIGN PATENT DOCUMENTS

| | | | |
|---|---|---|---|
| GB | 2275454 | A | 8/1994 |
| KR | 10-2010-001939 | | 2/2010 |
| WO | 2017203568 | A1 | 11/2017 |
| WO | 2017208153 | A1 | 12/2017 |
| WO | 2019203902 | A2 | 10/2019 |
| WO | 2019203903 | A2 | 10/2019 |
| WO | 2019226201 | A2 | 11/2019 |
| WO | 2020106774 | A1 | 5/2020 |
| WO | 2022087027 | A1 | 4/2022 |
| WO | 2022094325 | A1 | 5/2022 |
| WO | 2022241483 | A2 | 11/2022 |

OTHER PUBLICATIONS

International Search Report and the Written Opinion of the International Search Authority dated Feb. 4, 2022 for International Application No. PCT/US21/55694.

N. Nathrath, et al. "Lightweight Intersatellitelink Antenna (LISA) operating at Ka-Band," Technical University of Munich, Institute of Astronautics, Munich, Germany, Published Apr. 12, 2010, Downloaded on Apr. 23, 2023 UTC from IEEE Xplore, 4 Pages.

International Search Report and the Written Opinion of the International Search Authority dated Feb. 3, 2022 for International Application No. PCT/US21/057428.

(56) References Cited

OTHER PUBLICATIONS

International Search Report and the Written Opinion of the International Search Authority dated Dec. 5, 2022 for International Application No. PCT/US21/72358.
Motomi Abe, et al., "Ka-Band Branch Line Coupler Applied Hexagonal Waveguide Suitable for Additive Manufacturing," IEICE Trans. Electron., vol. E101-C, No. 10, Oct. 2018, pp. 805-814, The Institute of Electronics, Information and Communication Engineers.
Motomi Abe, et al., "A 3-D Metal-Direct-Printed, Low-Cost, and Light Hexagonal Waveguide Ka-Band Branch Line Coupler," Proceedings of the 47th European Microwave Conference, Oct. 2017, pp. 188-191, EuMA, Nuremberg Germany.
Zhang Kai, et al., "A Novel Design of Circularly Polarized Waveguide Antenna," 2014 3rd Asia-Pacific Conference on Antennas and Propagation, 2014, pp. 130-133, IEEE, Harbin, China.
James P. Becker, et al., "Toward a Novel Planar Circuit Compatible Silicon Micromachined Waveguide," Electrical Engineering and Computer Science, The University of Michigan, 1999, pp. 221-224, IEEE, Ann Arbor, Michigan.
English translation of Office Action issued by the Korean Intellectual Property Office on Feb. 2, 2024, in Korean Application No. 10-2023-7017971.

* cited by examiner

INTEGRATED BALANCING RADIATING ELEMENTS

CROSS-REFERENCE TO RELATED APPLICATIONS

This application claims the benefits of U.S. Provisional Patent Application No. 63/107,304, filed Oct. 29, 2020, entitled "INTEGRATED BALANCED RADIATING ELEMENT," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

The disclosure relates generally to systems, methods, and devices related to antennas and specifically relates to waveguides and other elements of a broadband antenna array.

BACKGROUND

Antennas are ubiquitous in modern society and are becoming an increasingly important technology as smart devices multiply and wireless connectivity moves into exponentially more devices and platforms. An antenna structure designed for transmitting and receiving signals wirelessly between two points can be as simple as tuning a length of a wire to a known wavelength of a desired signal frequency. At a particular wavelength (which is inversely proportional to the frequency by the speed of light $\lambda = c/f$) for a particular length of wire, the wire will resonate in response to being exposed to the transmitted signal in a predictable manner that makes it possible to "read" or reconstruct a received signal. For simple devices, like radio and television, a wire antenna serves well enough.

Passive antenna structures are used in a variety of different applications. Communications is the most well-known application, and applies to areas such as radios, televisions, and internet. Radar is another common application for antennas, where the antenna, which can have a nearly equivalent passive radiating structure to a communications antenna, is used for sensing and detection. Common industries where radar antennas are employed include weather sensing, airport traffic control, naval vessel detection, and low earth orbit imaging. A wide variety of high-performance applications exist for antennas that are less known outside the industry, such as electronic warfare and ISR (information, surveillance, and reconnaissance) to name a couple.

High-performance antennas are required when high data rate, long range, or high signal-to-noise ratios are required for a particular application. In order to improve the performance of an antenna to meet a set of system requirements, for example on a satellite communications (SATCOM) antenna, it is desirable to reduce the sources of loss and increase the amount of energy that is directed in a specific area away from the antenna (referred to as 'gain'). In the most challenging applications, high performance must be accomplished while also surviving demanding environmental, shock, and vibration requirements. Losses in an antenna structure can be due to a variety of sources: material properties (losses in dielectrics, conductivity in metals), total path length a signal must travel in the passive structure (total loss is loss per length multiplied by the total length), multi-piece fabrication, antenna geometry, and others. These are all related to specific design and fabrication choices that an antenna designer must make when balancing size, weight, power, and cost performance metrics (SWaP-C). The gain of an antenna structure is a function of the area of the antenna and the frequency of operation. To create a high gain antenna is to increase the total area with respect to the number of wavelengths, and poor choice of materials or fabrication method can rapidly reduce the achieved gain of the antenna by increasing the losses in the passive feed and radiating portions.

One of the lowest loss and highest performance RF structures is hollow metal waveguide. This is a structure that has a cross section of dielectric, air, or vacuum which is enclosed on the edges of the cross section by a conductive material, typically a metal like copper or aluminum. Typical cross sections for hollow metal waveguide include rectangles, squares, and circles, which have been selected due to the ease of analysis and fabrication in the $19^{th}$ and $20^{th}$ centuries. Air-filled hollow metal waveguide antennas and RF structures are used in the most demanding applications, such as reflector antenna feeds and antenna arrays. Reflector feeds and antenna arrays have the benefit of providing a very large antenna with respect to wavelength, and thus a high gain performance with low losses.

Every physical component is designed with the limitations of the fabrication method used to create the component. Antennas and RF components are particularly sensitive to fabrication method, as the majority of the critical features are inside the part, and very small changes in the geometry can lead to significant changes in antenna performance. Due to the limitations of traditional fabrication processes, hollow metal waveguide antennas and RF components have been designed so that they can be assembled as multi-piece assemblies, with a variety of flanges, interfaces, and seams. All of these joints where the structure is assembled together in a multi-piece fashion increase the size, weight, and part count of a final assembly while at the same time reducing performance through increased losses, path length, and reflections. This overall trend of increased size, weight, and part count with increased complexity of the structure have kept hollow metal waveguide antennas and RF components in the realm of applications where size, weight, and cost are less important than overall performance.

One example of a component for waveguides is a transition between a coaxial waveguide input/output and a hollow waveguide. A "transition" is the region of the waveguide that converts the impedance or mode in one region of waveguide to the impedance or mode of another region of waveguide. In other words, an antenna, for example, transmitting an electromagnetic signal may provide the electromagnetic signal through a hollow waveguide into a transition where the electromagnetic signal is propagated in a hollow waveguide mode and converted into a coaxial waveguide mode propagating in a coaxial waveguide that is connected to the antenna. Likewise, an antenna receiving an electromagnetic signal may receive the electromagnetic signal from an antenna element connected to a coaxial waveguide which transitions to a hollow waveguide. The transitions serve an electromagnetic signal from a coaxial waveguide to a hollow waveguide or vice versa.

Accordingly, conventional hollow waveguides have been manufactured using conventional subtractive manufacturing techniques which limit specific implementations for waveguides to the standard rectangular, square, and circular cross-sectional geometries that have the limitations described above. Additive manufacturing techniques provide opportunities, such as integrating waveguide structures with other RF components such that a plurality of RF components may be formed in a smaller physical device with improved overall performance. However, the process of fabricating a traditional rectangular, square, or circular waveguide structure in additive manufacturing typically leads to suboptimal performance and increased total cost in integrated waveguide structures. Novel cross-sections for waveguide structures that take advantage of the strengths of additive manufacturing will allow for improved performance of antennas and RF components while reducing total cost for a complex assembly.

It is therefore one object of this disclosure to provide coaxial waveguide to hollow waveguide structures that may be optimally fabricated with three dimensional printing techniques (aka additive manufacturing techniques). It is a further object of this disclosure to provide coaxial waveguide transition to hollow waveguide structures that enable novel array geometries. It is a further object of this disclosure to provide coaxial waveguide transition to hollow waveguide structures that are integral with other RF components.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
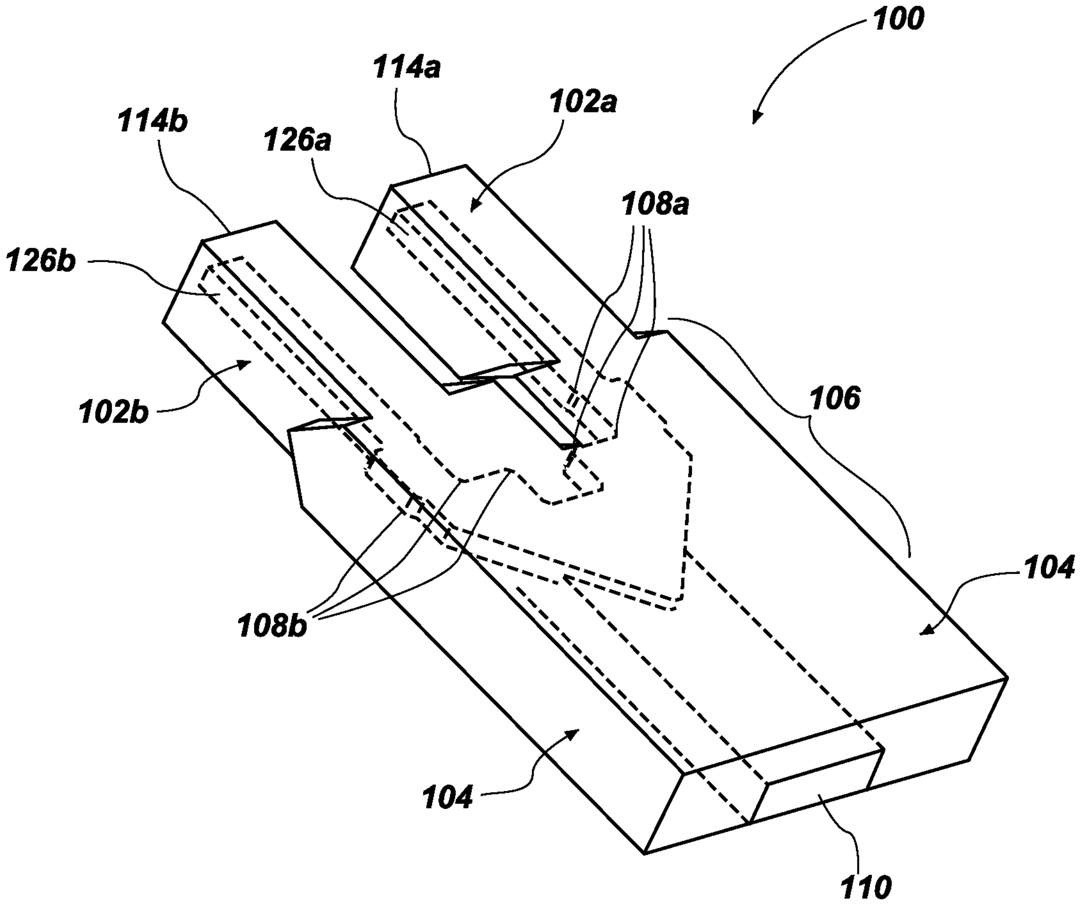
FIG. 1 illustrates a perspective view of a hollow single ridge waveguide to dual-coaxial waveguide transition.

Disclosed herein are improved systems, methods, and devices for communicating electromagnetic energy with an antenna array. Specifically disclosed herein are improved dual-polarization antenna arrays comprising a plurality of waveguide transition devices and a plurality of radiating components. The antenna array is arranged such that nearest-neighbor pairs of radiating elements are orthogonal relative to one another.

An antenna assembly described herein includes a waveguide transition device comprising two or more coaxial waveguides. The antenna assembly further includes a radiating component comprising: two or more radiating elements configured to receive or transmit electromagnetic energy through two or more signal ears, wherein each of the two or more signal ears is in communication with a coaxial waveguide of the two or more coaxial waveguides. The antenna assembly is dual polarized.

Further specifically disclosed herein are improved transitions for combining or splitting electromagnetic energy moving between dual coaxial waveguide ports and a hollow waveguide port. A device disclosed herein includes a hollow waveguide port, two or more coaxial waveguide ports, and a transition disposed between the waveguide port and the two or more coaxial waveguide ports. The transition combines or divides electromagnetic energy depending on the direction of travel between the waveguide port and the two or more coaxial waveguide ports. The device may be constructed with metal additive manufacturing techniques (three-dimensional metal printing) and include a series of intricate impedance steps and tapers for transitioning impedance of the electromagnetic energy.

Embodiments described herein are directed generally to the movement of electromagnetic energy through an array of antennas. The embodiments described herein enable the collection or transmission of an increased amount of electromagnetic energy over an increased distance-of-travel through the use of precise waveguides, transitions, and antenna arrays.

In electromagnetic field theory, the reciprocity theorem (also known as the Lorentz reciprocity theorem) is associated with the coupling energy between fields produced by one source on another. According to antenna reciprocity, the ratio of transmitted power from the transmitting antenna to the received power of the receiving antenna will not change even when the modes of the antennas are interchanged. Reciprocity in antenna communication is desirable because it offers the opportunity to interchangeably use a single pair of antennas in both receiving and transmitting modes. Described herein are antenna arrays comprising a plurality of antenna pairs with orthogonal orientations. This increases the power of the electromagnetic energy being transmitted or received by the antenna array.

Embodiments described herein include improved configurations for a waveguide that can be implemented in an antenna. A waveguide includes a hollow enclosed space for carrying or propagating waves of electromagnetic radiation. In radio-frequency engineering and communications engineering, a waveguide is commonly a hollow metal pipe used to carry radio waves. The electromagnetic waves in a waveguide (which may include a metal pipe or other hollow space) may be imagined as travelling down the guide with a time-varying electric field that is oriented in a discrete set of configurations within the waveguide, dependent on frequency and geometry. Depending on the frequency, waveguides can be constructed of conductive or dielectric materials. Generally, the lower the frequency to be passed, the larger the waveguide. In practice, waveguides allow energy over a set of frequencies to move in both directions, similar to cables or PCB traces. For such applications, it is generally desired to operate waveguides with only one mode propagating through the waveguide, or a set of well-defined modes propagating through the waveguide.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Before the structure, systems, and methods for creating waveguide transitions are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the terms "hollow ridged waveguide" and "hollow waveguide" broadly encompass waveguides that are single/dual ridge waveguides or waveguides without a ridge, any of which do not have a center conductor, as would be appropriate to a particular application known to those of ordinary skill in the art and those waveguides that are hollow in rectangular, circular, hexagonal, or other geometrical shapes. For example, where applications of the disclosure are specific to a particular waveguide type (e.g., a hollow waveguide vs. a coaxial waveguide vs. an optical waveguide) this disclosure refers to those particular waveguide types by name to differentiate "hollow ridge waveguides" and "hollow waveguides" from waveguides that may be coaxial waveguides, which have a center conductor and an outer conductor, or optical waveguides, which are generally made from a solid dielectric, or other different types and kinds of waveguides. However, a "waveguide" broadly refers to all waveguides of various types and kinds.

It is also noted that many of the figures discussed herein show air volumes of various implementations of waveguides, waveguide components, and/or waveguide transitions. In other words, these air volumes illustrate negative spaces of the components within a fabricated element which are created by a metal skin installed in the fabricated element, as appropriate to implement the functionality described. It is to be understood that positive structures that create the negative space shown by the various air volumes are disclosed by the air volumes, the positive structures including a metal skin and being formed using the additive manufacturing techniques disclosed herein.

For the purposes of this description as it relates to metal additive manufacturing, the direction of growth over time is called the positive z-axis, or "zenith" while the opposite direction is the negative z-axis or "nadir." The nadir direction is sometimes referred to as "downward" although the orientation of the z-axis relative to gravity makes no difference in the context of this invention. The direction of a surface at any given point is denoted by a vector that is normal to that surface at that point. The angle between that vector and the negative z-axis is the "overhang angle," θ ("theta").

The term "downward facing surface" is any non-vertical surface of an object being fabricated in a metal additive manufacturing process that has an overhang angle, θ, measured between two vectors originating from any single point on the surface. The two vectors are: (1) a vector perpendicular to the surface and pointing into the air volume and (2) a vector pointing in the nadir (negative z-axis, opposite of the build, or zenith) direction. An overhang angle, θ, for a downward facing surface will generally fall within the range: $0° \leq \theta < 90°$. Overhang angles, θ, for downward facing surfaces are illustrated in various embodiments of hollow metal waveguides, as further described below. As used herein, downward facing surfaces are unsupported by removable support structures from within a waveguide during fabrication, for example, which means that no internal bracing exists within a cavity of a waveguide for supporting downward facing surfaces or build walls.

Referring now to the figures, FIG. 1 illustrates an isometric view of a waveguide transition device 100 comprising a single ridge waveguide 104 to dual coaxial waveguides 102*a*, 102*b*. Some of the figures herein are illustrated such that the dotted lines represent solid components (may be constructed of metal), and non-dotted lines represent the outline of negative space. This convention is specifically applied to FIGS. 1-13, 17, 19, and 24. In FIG. 1, for example, the space between a dotted line and a non-dotted line represents the absence of an element and a negative space wherein air can pass through. This negative space may serve as a waveguide for propagating electromagnetic energy. The negative space may be defined by a metal structure or other solid component.

The waveguide transition device 100 includes, as a part of dual-coaxial waveguides, a first coaxial waveguide 102*a*, with inner conductor 126*a* and outer conductor 114*a*; and a second coaxial waveguide 102*b*, with inner conductor 126*b* and outer conductor 114*b*, which may each be connected via the inner conductors 126*a*, 126*b* to a coaxially-fed antenna array element. The coaxial waveguides (may collectively be referred to herein with callout 102) may be constructed of metal for conducting electromagnetic energy between the inner conductors 126 and outer conductors 114 in a TEM mode. The waveguide transition device 100 includes an impedance transition area 106 which serves to match the impedance of the hollow ridged waveguide 104 to the dual coaxial waveguides 102. The impedance transition area 106 may be referred to herein as a "transition."

The device includes a hollow waveguide 104 for propagating electromagnetic energy. The waveguide 104 represents negative space, or the absence of a structure wherein electromagnetic energy can travel in air, vacuum, or other non-conductive material. The transition 106 is configured for transitioning the electromagnetic energy from the hollow single ridge waveguide port 110, through the waveguide 104, and to the coaxial waveguides 102*a*, 102*b*. The coaxial waveguides 102*a*, 102*b* each include an inner conductor 126*a*, 126*b* and an outer conductor 114*a*, 114*b*. The electric field occupies the space between the inner conductor 126 and the outer conductor 114 with minimal penetration into either conductor such that only the electrons near the surface within some number of "skin depths" are excited to move by the field.

The transition 106 is an impedance transition and power combiner/divider region. The transition 106 converts a TE10 mode in the hollow single ridge waveguide to a transverse electromagnetic (TEM) mode in each of the dual coaxial waveguides. The transition 106 also acts as a power combiner or divider depending on which direction an electromagnetic wave is being propagated (e.g., being received or being transmitted). The impedance of the transition 106 may include impedance matching elements 108*a* and 108*b* which may include indents, outdents, steps with rounded corners, steps with corners which are disposed at an angle of 90° or less between adjoining faces of the step, and other features which serve to match the impedance of the transition 106 to a hollow ridged waveguide or to a coaxial waveguide. It is also to be noted that the impedance matching elements 108*a* and 108*b* may further be matched to each other on opposing sides of the transition (e.g., be symmetric or mirror images of each other).

The waveguide transition device 100 may further include a waveguide port 110 for the transition which may be a single ridge waveguide 104 in the example of FIG. 1. The waveguide transition device 100 may be connected to a host of other waveguide components for propagating an electromagnetic wave, including antennas, power combiners, power dividers, radiating elements, and others, for example. Other transitions, such as dual-ridge transitions are disclosed below. The waveguide transition device 100 may serve to match the impedance of an antenna, particularly a broadband antenna, at the radiating element of the array, with the impedance transition between a coaxial waveguide and a hollow waveguide through the impedance transition 106 using impedance elements 108*a* and 108*b*. As shown in FIG. 1, the waveguide transition device 100 may support a fundamental $TE_{10}$ mode of a hollow single ridge waveguide at waveguide port 110 and a TEM mode at each of the coaxial waveguide conductors. Further, the transition may connect coaxial waveguides 102*a*, 102*b* to a coaxial-fed antenna array element on one end of the waveguide transition device 100 and hollow waveguide corporate combiner network on another end, such as waveguide port 110 of the waveguide transition device 100.

It should also be noted that while the first coaxial waveguide 102*a* and the second coaxial waveguide 102*b* are shown as having a rectangular or square cross-sectional geometry, other geometries are possible, such as circular, elliptical, or multi-faceted polygon geometries, to adjust specific characteristics of the operation of the waveguide and interface with a coaxial-fed antenna array element.

Finally, as discussed above, the waveguide transition device 100 may be made using metal additive manufacturing techniques (i.e., three-dimensional metal printing) which provide significant added benefit to the process of making the waveguide transition device 100. In some cases, metal additive manufacturing techniques allow the waveguide transition device 100 to be made where conventional techniques (such as CNC milling, for example) would be unable to replicate the shapes, sides, and construction of the waveguide transition device 100.

Figure 2:
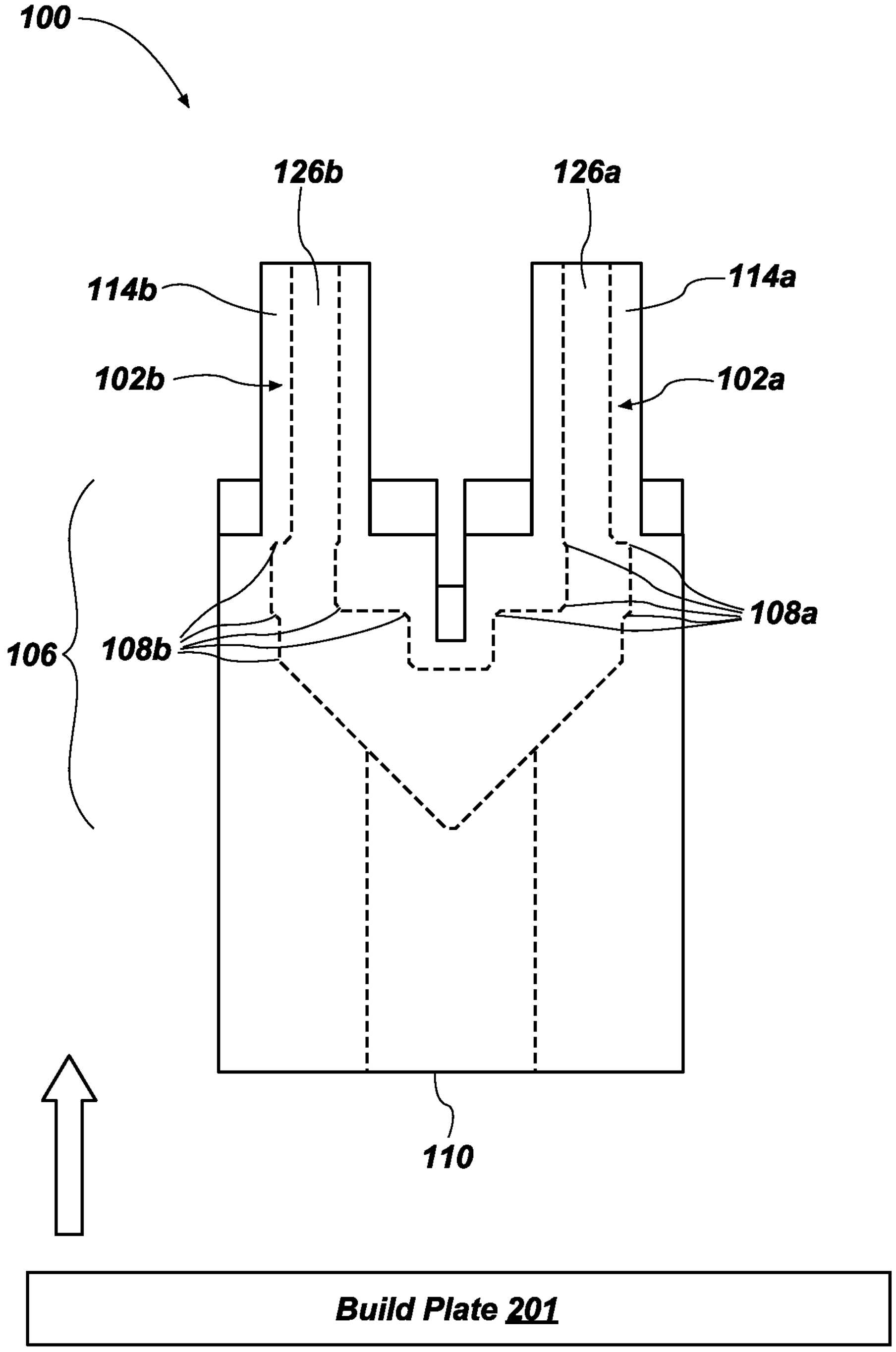
FIG. 2 illustrates a cross-sectional view of a hollow single ridge waveguide to dual-coaxial waveguide transition.

FIG. 2 illustrates a cross-sectional view of a waveguide transition device 100 comprising a single ridge waveguide to dual-coaxial waveguides 102*a*, 102*b*, also shown in FIG. 1. The waveguide transition device 100 may include a first coaxial waveguide 102*a* and a second coaxial waveguide 102*b* which may each be connected to a coaxial-fed antenna array element. Each of the coaxial waveguides 102*a*, 102*b* may be constructed of a metal or other conductive material. The transition may further include an impedance transition 106 which serves to match the impedance of the coaxial waveguides to other hollow waveguide components and to the coaxial input/output requirements. The transition 106 also acts as a power combiner or divider depending on which direction an electromagnetic wave is being propagated (e.g., being received or being transmitted). The impedance transition 106 may include impedance matching elements 108*a* and 108*b* which may include indents, outdents, steps with rounded corners, and other features which serve to match the impedance of the impedance transition 106 to a waveguide or to a coaxial input/output. It is also to be noted that impedance matching elements 108*a* and 108*b* may further be matched to each other on opposing sides of the transition (e.g., be symmetric or mirror images of each other).

The waveguide transition device 100 may further include a hollow waveguide port 110 for the transition which may be a hollow single ridge waveguide in the example of FIG. 2. The waveguide transition device 100 may be connected to a host of other waveguide components for propagating an electromagnetic wave, including antennas, power combiners, power dividers, radiating elements, and others, for example. Other transitions, such as dual-ridge transitions are disclosed below. The transition may serve to match the impedance of an antenna, particularly a broadband antenna, at the radiating element of the array, with the impedance transition between a coaxial waveguide and a hollow waveguide through the impedance transition 106 using impedance elements 108*a* and 108*b*. As shown in FIG. 2, the transition may support a fundamental $TE_{10}$ mode in the hollow waveguide and a TEM mode in each of the coaxial waveguides.

The device may be constructed with metal additive manufacturing (i.e., metal three-dimensional printing). The device may be constructed upward relative to a build plate 201, wherein the z-axis for purposes of metal additive manufacturing is orthogonal to the plane of the build plate 201. The device may be designed to ensure all overhanging angles are oriented for an additive manufacturing process.

Figure 3:
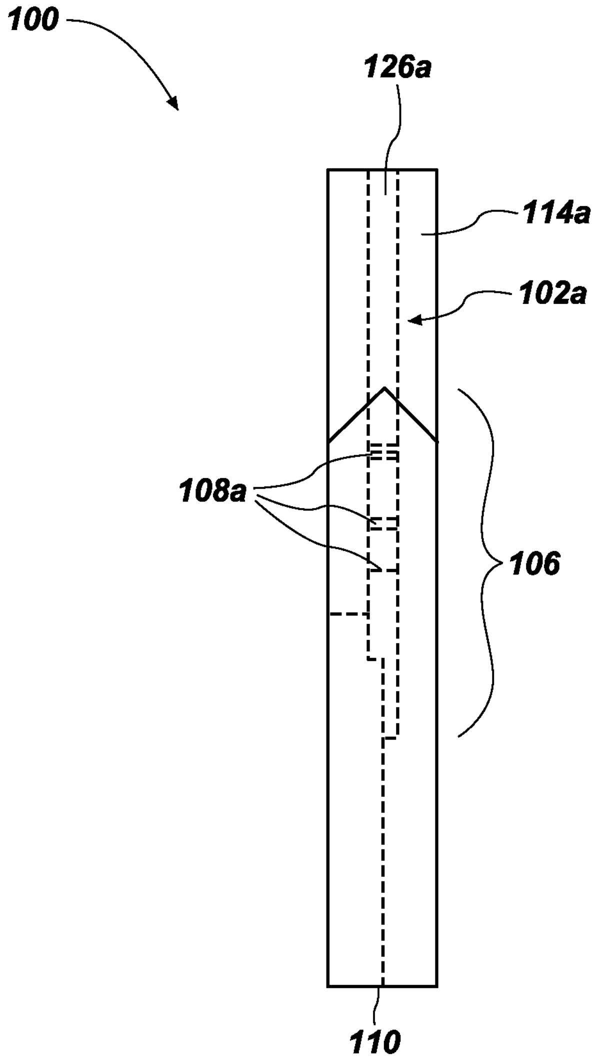
FIG. 3 illustrates a side view of a hollow single ridge waveguide to dual-coaxial waveguide transition.

FIG. 3 illustrates a side view of a waveguide transition device 100 comprising a single ridge waveguide to dual-coaxial waveguides, also shown in FIG. 1 and FIG. 2. The waveguide transition device 100 may include a first coaxial waveguide 102*a* and a second coaxial waveguide 102*b* (shown in FIG. 1 and FIG. 2 and not shown in FIG. 3 due to perspective) which may each be connected to a coaxial-fed antenna array element. The first coaxial waveguide 102*a* includes an inner conductor 126*a* and an outer conductor 114*a*.

The waveguide transition device 100 may further include an impedance transition 106 which serves to match the impedance of the hollow waveguide to other waveguide components and to the coaxial waveguide. The transition 106 also acts as a power combiner or divider depending on which direction an electromagnetic wave is being propagated (e.g., being received or being transmitted). The impedance transition 106 may include impedance matching elements 108*a* and 108*b* (108*b* shown in FIG. 1 and FIG. 2 and not shown in FIG. 3 due to perspective) which may include indents, outdents, steps with rounded corners, and other features which serve to match the impedance of the impedance transition 106 to a hollow waveguide or to a coaxial waveguide. It is also to be noted that impedance matching elements 108*a* and 108*b* may further be matched to each other on opposing sides of the transition (e.g., be symmetric or mirror images of each other).

The waveguide transition device 100 may further include a hollow waveguide port 110 for the transition which may be a hollow single ridge waveguide in the example of FIG. 3. The transition may be connected to a host of other waveguide components for propagating an electromagnetic wave, including antennas, power combiners, power dividers, radiating elements, and others, for example. Other transitions, such as dual-ridge transitions are disclosed below. The transition may serve to match the impedance of an antenna, particularly a broadband antenna, at the radiating element of the array, with the impedance transition between a coaxial waveguide and a hollow waveguide through the impedance transition 106 using impedance elements 108*a* and 108*b*. As shown in FIG. 3, the transition may support a fundamental $TE_{10}$ mode of a hollow waveguide and a TEM mode of a coaxial waveguide.

Figure 4:
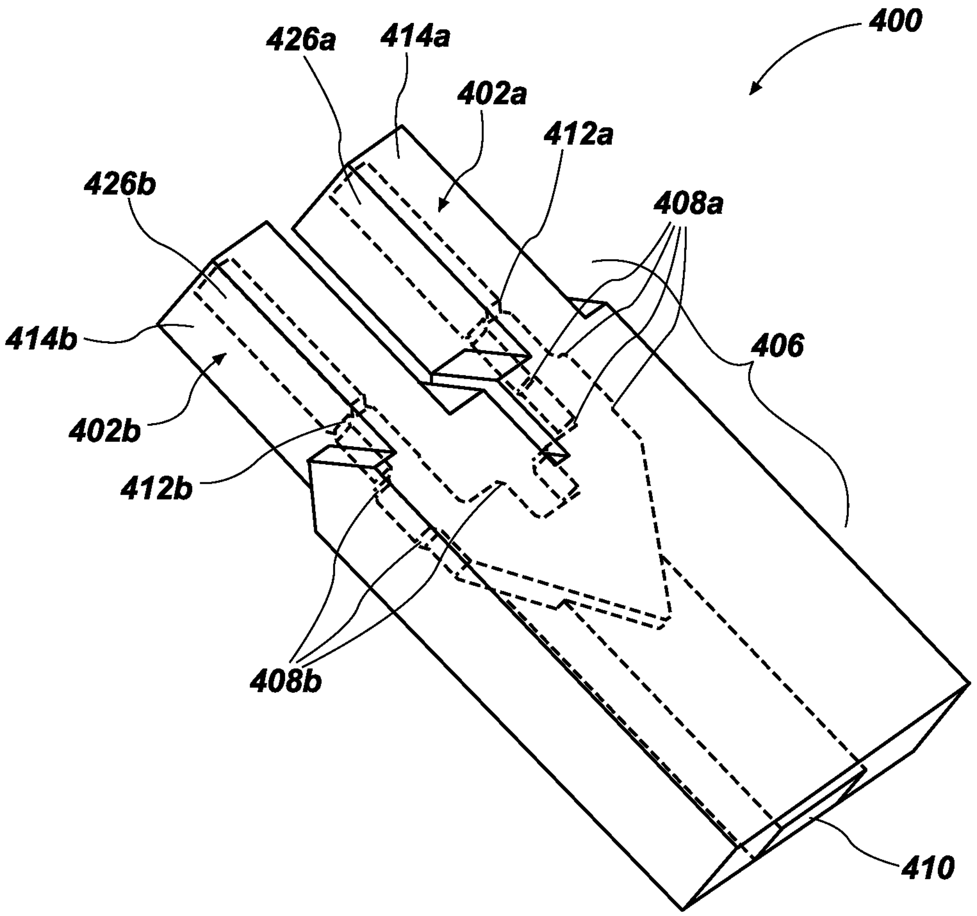
FIG. 4 illustrates a perspective view of a hollow single ridge waveguide to dual-coaxial transition with a rotated impedance transition.

FIG. 4 illustrates an isometric view of a waveguide transition device 400 comprising a single ridge waveguide to dual-coaxial waveguide transition with a rotated coaxial center conductor at the coaxial waveguide ports. The waveguide transition device 400 illustrated in FIG. 4 is similar to the waveguide transition device 100 illustrated in FIGS. 1-3 but with the addition of the rotational offset of the waveguide, as discussed further herein.

The waveguide transition device 400 may include a first coaxial waveguide 402*a* and a second coaxial waveguide 402*b* which may each be connected to a coaxial-fed antenna array element. The waveguide transition device 400 may further include an impedance transition 406 which serves to match the impedance of the waveguide to other waveguide components and to the coaxial input/output requirements. The transition 406 also acts as a power combiner or divider depending on which direction an electromagnetic wave is being propagated (e.g., being received or being transmitted). The impedance transition 406 may include impedance matching elements 408*a* and 408*b* which may include indents, outdents, steps with rounded corners, and other features which serve to match the impedance of the impedance transition 406 to a waveguide or to a coaxial input/output. It is also to be noted that impedance matching elements 408*a* and 408*b* may further be matched to each other on opposing sides of the waveguide transition device 400 (e.g., be symmetric or mirror images of each other).

The waveguide transition device 400 may further include a hollow waveguide port 410 for the waveguide transition device 400 which may be a hollow single ridge waveguide in the example of FIG. 4. The waveguide transition device 400 may be connected to a host of other waveguide components for propagating an electromagnetic wave, including antennas, power combiners, power dividers, radiating elements, and others, for example. Other transitions, such as dual-ridge transitions are disclosed below. The waveguide transition device 400 may serve to match the impedance of an antenna, particularly a broadband antenna, at the radiating element of the array, with the impedance transition 406 between a coaxial waveguide and a hollow waveguide through the impedance transition 406 using impedance elements 408*a* and 408*b*. As shown in FIG. 4, the waveguide transition device 400 may support a fundamental $TE_{10}$ mode of a hollow waveguide and a TEM mode of a coaxial waveguide. As will be discussed below, a dual ridge waveguide may also support a $TE_{10}$ mode for a hollow waveguide. Further, the waveguide transition device 400 may connect coaxial waveguides 402*a*, 402*b* to a coaxial-fed antenna element on one end of the waveguide transition device 400 and additional hollow waveguide components on another end, such as waveguide port 410 of the waveguide transition device 400.

It should also be noted that while first coaxial waveguide 402*a* and second coaxial waveguide 402*b* are shown as being rectangular/square in cross-section, other cross-section geometries are possible, such as circular, or multi-faceted polygon geometries, to adjust specific characteristics of the operation of the waveguide and interface with a coaxial-fed antenna element.

As shown in FIG. 4, the waveguide transition device 400 includes a first coaxial waveguide 402*a* and a second coaxial waveguide 402*b* which include a rotational offset 412*a*, and 412*b*, respectively. The rotational offset 412*a* and the rotational offset 412*b* may allow the waveguide transition device 400 to operate in one of an E-plane and an H-plane of a radiating element or, alternatively, provide for an additional impedance change for correct impedance matching purposes. For example, the transition shown in FIG. 1 may be joined in a combiner network with the waveguide transition device 400, where the first coaxial waveguide 402*a* and second coaxial waveguide 402*b* are rotated 90 degrees from an orientation of first coaxial waveguide 102*a* and second coaxial waveguide 102*b* of the transition, allowing the transition to operate in an E-plane of a coaxially fed radiating element, for example, and the waveguide transition device 400 to operate in an H-plane of a coaxially fed radiating element, for example. The rotational offsets 412*a* and 412*b* provide a twist in the first coaxial waveguide 402*a* and the second coaxial waveguide 402*b* such that the metal conductor is continuous throughout the twist of the rotational offset 412*a* and 412*b*.

In an implementation, the rotational offsets 412*a*, 412*b* are implemented to ensure that the coaxial waveguides are offset 90-degrees relative to one another. In this implementation, the first coaxial waveguide 102*a* may be oriented orthogonal, or nearly orthogonal, to the second coaxial waveguide 102*b*.

Finally, as discussed above, the waveguide transition device 400 may be made using metal additive manufacturing techniques which provides significant added benefit to the process of making the waveguide transition device 400. In some cases, metal additive manufacturing techniques allows the waveguide transition device 400 to be made where conventional techniques (such as CNC milling, for example) would be unable to replicate the shapes, sides, and construction of the waveguide transition device 400.

Figure 5:
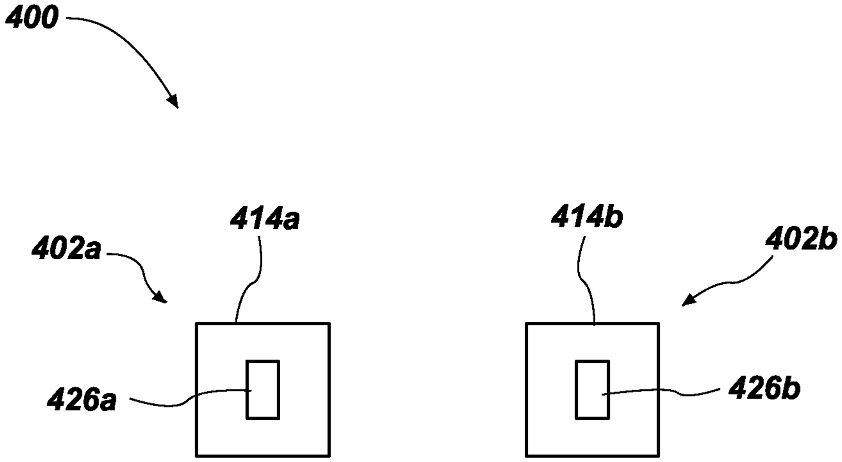
FIG. 5 illustrates a top view of metal center conductors and outer conductors of a coaxial waveguide within a single ridge waveguide to dual-coaxial waveguide transition.

FIG. 5 illustrates a top view of a waveguide transition device 400 comprising metal center conductors (426*a*, 426*b*) and metal outer conductors (414*a*, 414*b*) of dual-coaxial waveguides 402*a*, 402*b* in a single ridge waveguide to dual-coaxial waveguide transition, also shown in FIG. 4. FIG. 5 illustrates a first coaxial waveguide 402*a* that comprises an inner conductor 426*a* and an outer conductor 414*a*. The figure further illustrates a second coaxial waveguide 402*b* including an inner conductor 426*b* and an outer conductor 414*b*.

As shown in FIG. 5, a top of inner conductor 426*a* and a top of inner conductor 426*b* are disposed within outer conductors 414*a* and 414*b* of the coaxial waveguides 402*a* and 402*b*, and are rectangularly shaped, although other shapes are possible, as discussed above. As discussed above with respect to FIG. 4, the first coaxial waveguide 402*a* and the second coaxial waveguide 402*b* may be rotated by 90 degrees, as desired, to allow a coaxial radiating element connected to the waveguide transition device 400 to operate in the E-plane or the H-plane based on the requirements of a particular application.

The coaxial waveguides 402*a*, 402*b* may be sized to match to a radiating element coaxial geometry. The air volume (represented in FIG. 5 as the space between the inner and outer conductors of coaxial the waveguides 402*a*, 402*b* may be sized to provide impedance match between an antenna element and transition region inside the waveguide.

Figure 6:
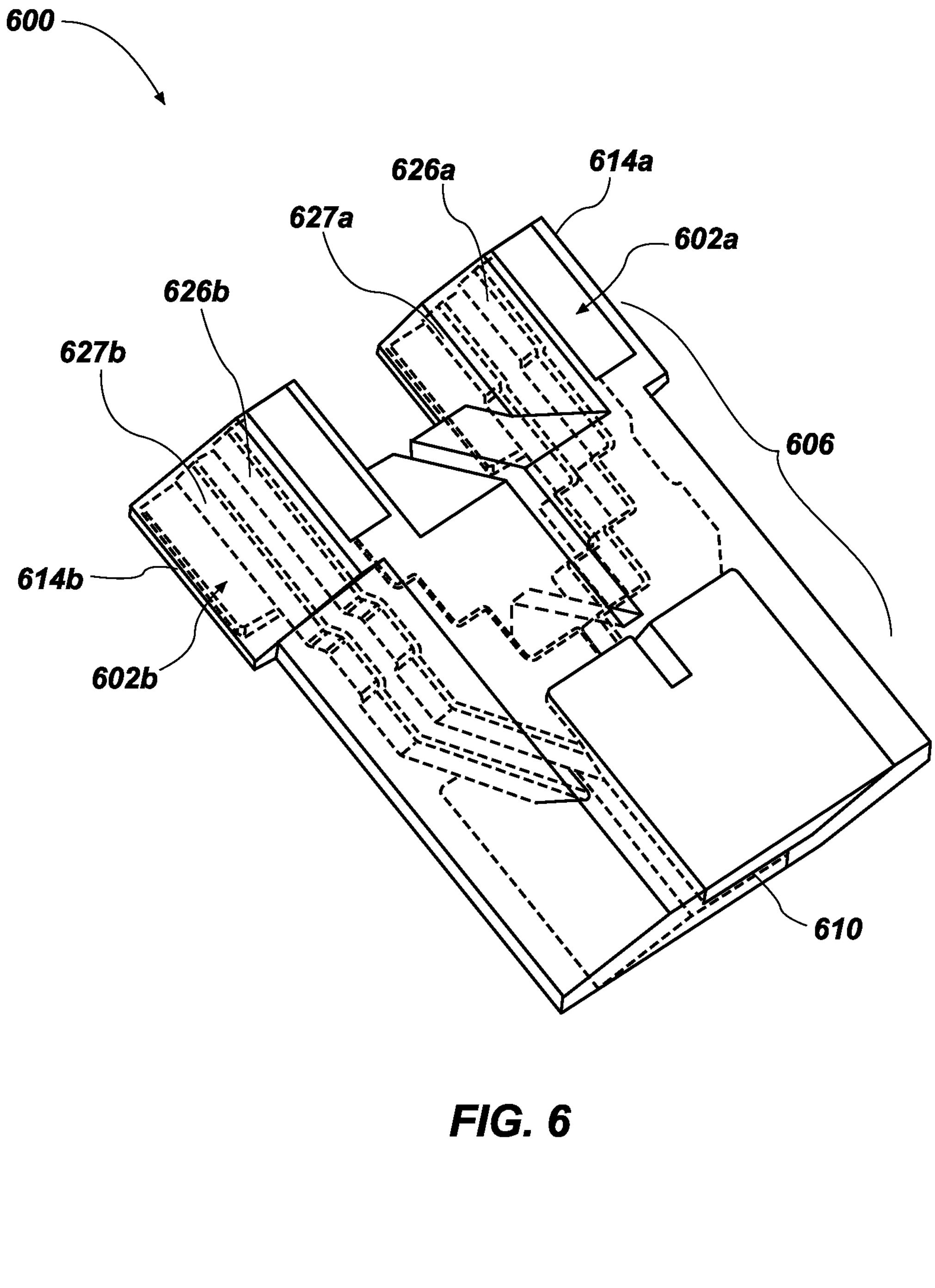
FIG. 6 illustrates a perspective view of a dual-ridge waveguide to dual twin-wire balanced coaxial waveguide transition.

FIG. 6 illustrates an isometric view of a waveguide transition device 600 comprising a hollow dual-ridge waveguide to dual twin-wire balanced coaxial waveguides. The waveguide transition device 600 essentially provides a direct conversion and power split from a hollow dual ridge waveguide $TE_{10}$ mode into a balanced twin-wire coaxial mode.

The waveguide transition device 600 includes three metal conductors for each of the two twin-wire balanced coaxial waveguides (e.g., two balanced inner conductors and one outer conductor in each twin-wire balanced coaxial waveguide arrangement). The first coaxial waveguide 602*a* includes a first inner conductor 626*a* and a second inner conductor 627*a* enclosed by the outer conductor 614*a* body of the twin-wire balanced coaxial waveguide. The second coaxial waveguide 602*b* includes a first inner conductor 626*b* and a second inner conductor 627*b* enclosed by the outer conductor 614*b* body of the twin-wire balanced coaxial waveguide. The waveguide transition device 600 may further include an impedance transition 606, which is similar in implementation and description to the transition 106, shown in FIG. 1 and including (and duplicating) impedance elements. The waveguide transition device 600 further includes a hollow dual ridge waveguide port 610.

Figure 7:
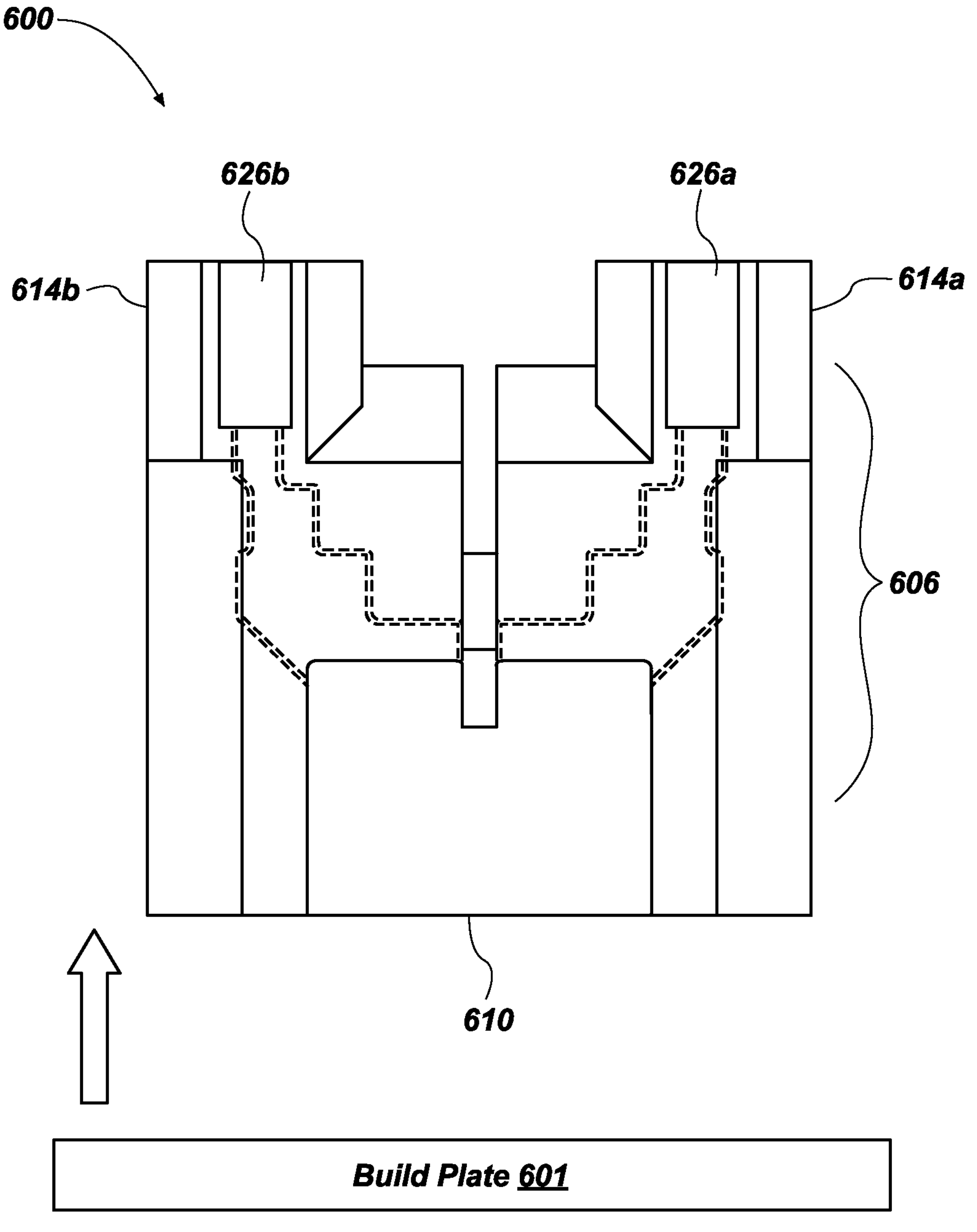
FIG. 7 illustrates a cross-sectional view of a dual-ridge waveguide to dual twin-wire balanced coaxial waveguide transition.

FIG. 7 illustrates a cross-sectional view of a waveguide transition device 600 comprising a hollow dual-ridge waveguide to dual twin-wire balanced coaxial ports, also shown in FIG. 6. The waveguide transition device 600 essentially provides a direct conversion and power split from a hollow dual ridge waveguide $TE_{10}$ mode into a balanced twin-wire coaxial mode, only one side of which is shown due to the perspective of FIG. 7, in a single waveguide transition device 600 to make the waveguide transition device 600 a hollow dual-ridge waveguide to dual twin-wire balanced coaxial waveguide transition.

Accordingly, the waveguide transition device 600 includes four inner metal conductors (e.g., a dual twin-wire arrangement). The device includes a first coaxial waveguide 602*a* including a first inner conductor 626*a* and a second inner conductor 627*a*. The device includes a second coaxial waveguide 602*b* including a first inner conductor 626*b* and a second inner conductor 627*b*. The second inner conductors 627*a*, 627*b* are not shown due to the cross sectional view of FIG. 7. The outer conductors 614*a*, 614*b* for the balanced twin-wire coaxial waveguide are provided by the external body of waveguide transition device 600. The waveguide transition device 600 may further include an impedance transition 606, which is similar in implementation and description to the transition 406, shown in FIG. 4 and including (and duplicating) impedance elements 408*a* and 408*b*. The waveguide transition device 600 further includes a hollow waveguide port 610.

The device may be constructed with metal additive manufacturing (i.e., metal three-dimensional printing). The device may be constructed upward relative to a build plate 601, wherein the z-axis for purposes of metal additive manufacturing is orthogonal to the plane of the build plate 601. The device may be designed to ensure all overhanging angles are oriented for an additive manufacturing process.

Figure 8:
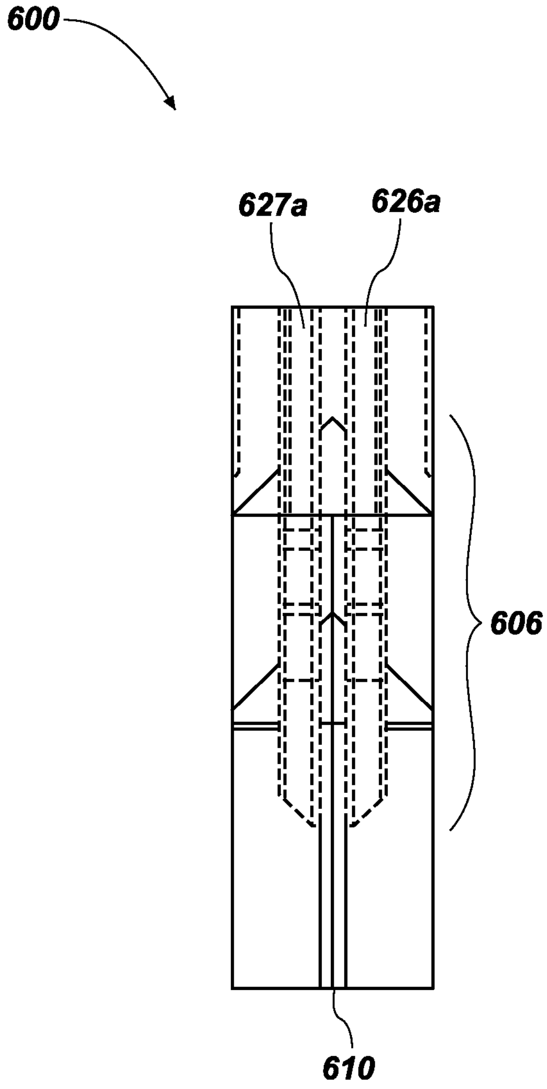
FIG. 8 illustrates a side view of a dual-ridge waveguide to dual twin-wire balanced coaxial waveguide transition.

FIG. 8 illustrates a side view of a waveguide transition device 600 comprising a hollow dual-ridge waveguide to dual twin-wire balanced coaxial waveguide, also shown in FIG. 6. The waveguide transition device 600 essentially provides a direct conversion and power split from a hollow dual ridge waveguide $TE_{10}$ mode into a balanced twin-wire coaxial mode. Accordingly, the waveguide transition device 600 includes four metal inner conductors (e.g., a dual twin-wire arrangement).

The first coaxial waveguide 602*a* includes a first inner conductor 626*a* and a second inner conductor 627*a*. The second coaxial waveguide 602*b* is not illustrated due to the perspective of FIG. 8. However, the first inner conductor 626*a* and the second inner conductor 627*a* of the first coaxial waveguide 602*a* are seen as discrete individual conductors for a balanced twin-wire coaxial waveguide. The waveguide transition device 600 may further include an impedance transition 606, which is similar in implementation and description to the transition 406, shown in FIG. 4 and including (and duplicating) impedance elements 408*a* and 408*b*. The waveguide transition device 600 further includes a hollow waveguide port 610.

Figure 9:
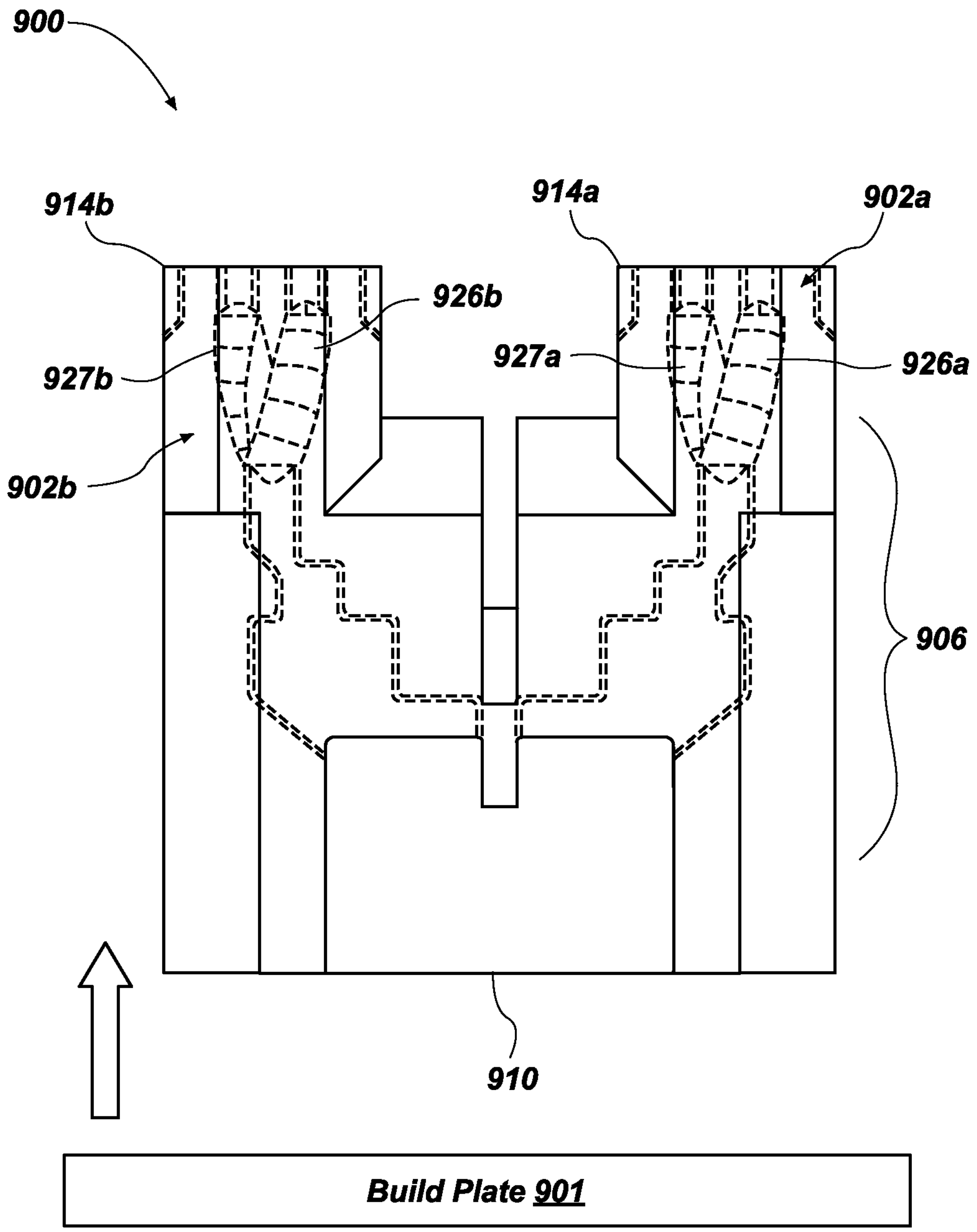
FIG. 9 illustrates a cross sectional view of a dual-ridge waveguide to dual twin-wire balanced helical coaxial waveguide transition with a helical twist coaxial wire waveguide.

FIG. 9 illustrates a cross sectional view of a waveguide transition device 900 comprising a hollow dual-ridge waveguide to dual twin-wire balanced coaxial waveguide with a helical twist twin-wire coaxial waveguide. FIG. 9 and the other figures herein (specifically, FIGS. 1-13, 17, 19, and 24) are illustrated such that the dotted lines represent solid components (may be constructed of metal), and non-dotted lines represent the outline of negative space. In FIG. 9, for example, the dotted lines represent coaxial wire within the waveguide that is oriented with a helical twist. The solid lines represent the outline of a solid component that is not illustrated, such that the space between a dotted line and a solid line represents negative space wherein air can pass through.

The waveguide transition device 900 essentially provides a direct conversion and power split from a hollow dual ridge waveguide $TE_{10}$ mode into a balanced twin-wire coaxial mode, including a helical twist in the balanced coaxial twin-wire waveguide to reorient the balanced twin wire orientation to align with a twin-wire fed radiating element.

Accordingly, the waveguide transition device 900 includes four metal inner conductors which are oriented within the waveguide transition device 900 with a helical 90-degree twist. The waveguide transition device 900 includes a first coaxial waveguide 902*a* and a second coaxial waveguide 902*b*. The first coaxial waveguide 902*a* includes twin wires in a helical twist formation, wherein the twin wires constitute the first inner conductor 926*a* and the second inner conductor 927*a* surround by the outer conductor 914*a*. Similarly, the second coaxial waveguide 902*b* includes twin wires in a helical twist formation, wherein the twin wires constitute the first inner conductor 926*b* and the second inner conductor 927*b* surround by the outer conductor 914*b*.

The twin wires in the helical twist formations (i.e., the inner conductors of the coaxial waveguides) are disposed between the impedance transition 906. The waveguide transition device 900 includes the impedance transition 906, which is similar in implementation and description to the transition 406, shown in FIG. 4 and including (and duplicating) impedance elements 408*a* and 408*b*. The waveguide transition device 900 further includes a hollow waveguide port 910.

The orientation of the conductor wires is determined based on the cross-sectional geometry of the wire. The cross-sectional geometry may be rectangular, square, elliptical, circular, or some other geometric shape. The orientation of the cross-sectional geometry of the conductor wire may be changed from a first end (at the impedance transition 906 region) to a second end (distal from the impedance transition 906 region). In an implementation as illustrated in FIG. 9, the orientation of the conductor wire at the second end is orthogonal relative to the orientation of the conductor wire at the first end. In this case, the helical twist formation causes the conductor wire to twist until its orthogonal to itself.

The device may be constructed with metal additive manufacturing (i.e., metal three-dimensional printing). The device may be constructed upward relative to a build plate 901, wherein the z-axis for purposes of metal additive manufacturing is orthogonal to the plane of the build plate 901. The device may be designed to ensure all overhanging angles are oriented for an additive manufacturing process.

Figure 10:
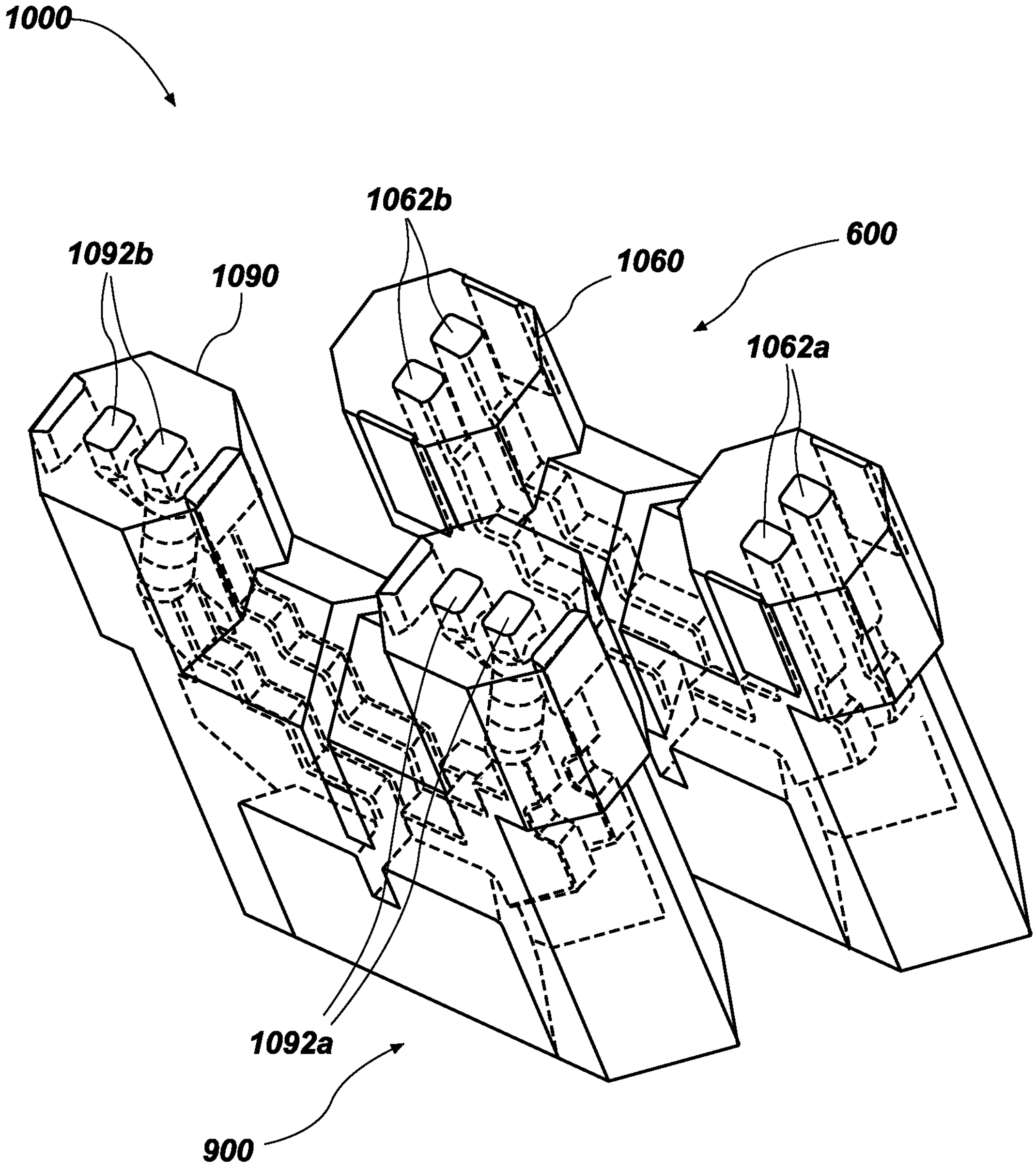
FIG. 10 illustrates a perspective view of two dual-ridge waveguide to dual twin-wire balanced coaxial waveguide with a helical twist coaxial wire waveguide at an orthogonal reorientation of the twin coaxial wire.

FIG. 10 illustrates a perspective view of a waveguide transition device 1000 comprising two hollow dual-ridge waveguide to dual twin-wire balanced coaxial waveguide transitions wherein the transition is similar in implementation and description to the waveguide transition device 600 and similar in implementation and description to the waveguide transition device 900. The waveguide transition device 1000 essentially includes the waveguide transition device 600 illustrated in FIG. 6 and the waveguide transition device 900 illustrated in FIG. 9.

The waveguide transition device 1000 includes the dual twin-wire balanced coaxial waveguide (see 600) illustrated in FIG. 6 and further includes the dual twin-wire balanced coaxial waveguide with a helical twist twin-wire coaxial waveguide (see 900) illustrated in FIG. 9. The helical twist coaxial twin-wire waveguide of the transition 1090 from waveguide transition device 900 orients the twin-wire balanced coaxial waveguide ports of the transition 1090 from waveguide transition device 900 at an orthogonal orientation relative to the twin-wire balanced coaxial waveguide ports of the transition 1060 from waveguide transition device 600. The transitions 1060, 1090 from devices 600 and 900 are combined into a single antenna array element to generate waveguide transition device 1000.

The pair of waveguides in each of devices 600 and 900 support two orientations of twin wire coax for feeding dual-polarized antenna array elements which are fed by a twin-wire balanced coaxial waveguide. The helical twist of the inner conductors within the coaxial waveguide allows for reorientation of the twin wire coax to align with the orientation of the twin-wire balanced antenna radiating element.

As shown in FIG. 10, twin-wire inner conductor pairs 1062*a* and 1062*b* are similarly oriented. The conductor pairs 1092*a* and 1092*b*, however, are oriented similarly to each other but orthogonal to conductor pairs 1062*a* and 1062*b*. The orientation of the conductor pairs is determined based on the cross-sectional orientation of the wire. In an implementation wherein the conductor wires comprise a cross-sectional rectangular geometry (as illustrated in FIG. 10), the orientation of the conductor wires is determined based on the long-side (or short-side) orientation of the cross-sectional rectangle. The cross-sectional rectangular geometry of the transition 1060 conductors or orthogonal relative to the cross-sectional rectangular geometry of the transition 1090 conductors.

Accordingly, the transitions 1060 and 1090 may each operate in one of an E-plane and an H-plane while also feeding a dual-polarization antenna array comprised of twin-wire balanced coaxial radiating elements. The helical twists implemented on conductor pairs 1092*a* and 1092*b* allow appropriate orientation or reorientation of twin-wire balanced coaxial waveguide fed antenna radiating elements and facilitate a dual polarization broadband antenna array.

Figure 11:
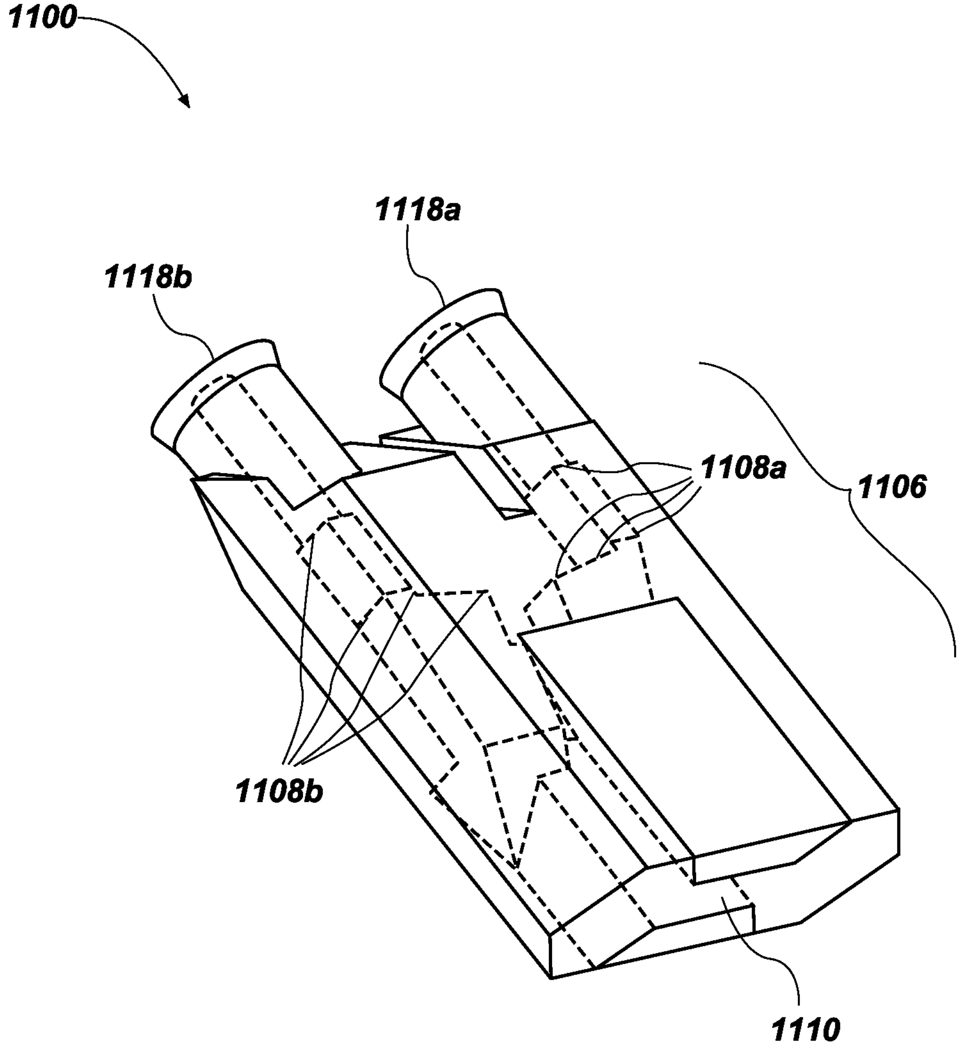
FIG. 11 illustrates a perspective view of a dual-ridge waveguide to dual-coaxial waveguide output transition.

FIG. 11 illustrates an isometric view of a waveguide transition device 1100 comprising a hollow dual-ridge waveguide to dual circular coaxial waveguide output. The waveguide transition device 1100 includes a first circular coaxial waveguide 1118*a* and a second circular coaxial waveguide 1118*b* (e.g., a cross section of the coaxial waveguide outer conductor and inner conductor are circular) as shown in FIG. 11. It should be noted that the cross sectional geometry of the inner conductor(s) disposed within the coaxial waveguide need not be the same cross-sectional geometry of the wholistic waveguide. For example, the coaxial waveguide may have an elliptical cross-sectional geometry while the one or more inner conductors disposed within the coaxial waveguide have a rectangular cross-sectional geometry.

The first and second circular coaxial waveguides 1118*a*, 1118*b* may each be directly connected to a coaxial-fed antenna element. The waveguide transition device 1100 may further include an impedance transition 1106 which serves to match the impedance of the waveguide transition device 1100 to other waveguide components and to the coaxial input/output requirements. The transition 1106 also acts as a power combiner or divider depending on which direction an electromagnetic wave is being propagated (e.g., being received or being transmitted). The impedance transition 1106 may include impedance matching elements 1108*a* and 1108*b* which may include indents, outdents, steps with rounded corners, a first and second taper of each ridge of a dual ridge waveguide to support the transition to a coaxial waveguide, and other features which serve to match the impedance of the impedance transition 1106 to a hollow waveguide or to a coaxial waveguide. It is also to be noted that impedance matching elements 1108*a* and 1108*b* may further be matched to each other on opposing sides of the waveguide transition device 1100 (e.g., be symmetric or mirror images of each other). The waveguide transition device 1100 may further include a hollow waveguide port 1110.

Figure 12:
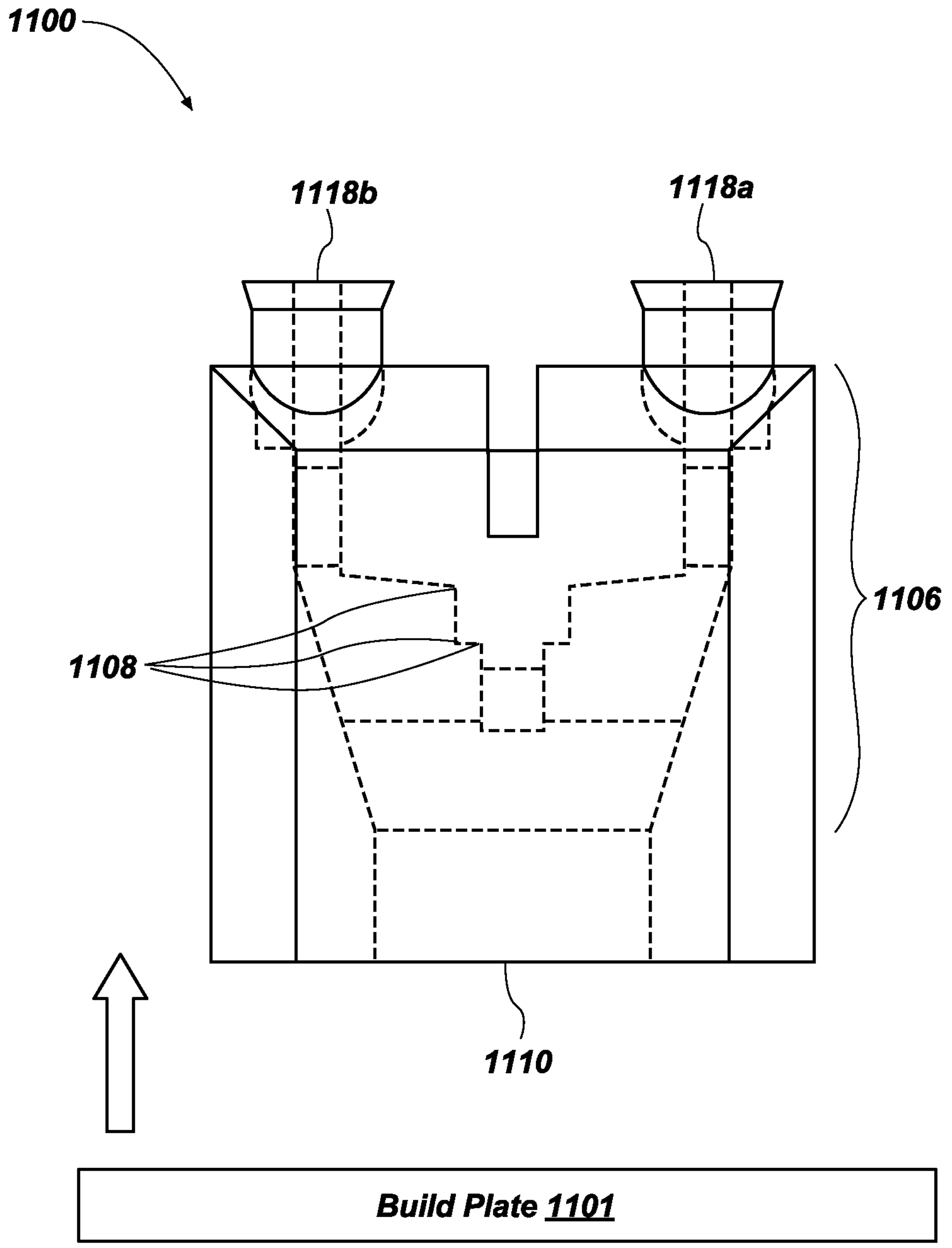
FIG. 12 illustrates cross-sectional view of a dual-ridge waveguide to dual coaxial waveguide output transition.

FIG. 12 illustrates cross-sectional view of a waveguide transition device 1100 comprising a dual-ridge waveguide to dual circular coaxial waveguide output, also shown in FIG. 11. The waveguide transition device 1100 may include a first and second circular coaxial waveguide 1118*a*, 1118*b* (e.g., a cross section of the coaxial waveguide outer conductor and inner conductor are circular) as shown in FIG. 11. The first and second circular coaxial waveguide 1118*a*, 1118*b* may each be connected to a coaxial-fed antenna element. The waveguide transition device 1100 may further include an impedance transition 1106 which serves to match the impedance of the waveguide transition device 1100 to other waveguide components and to the coaxial waveguide input/output requirements. The transition 1106 also acts as a power combiner or divider depending on which direction an electromagnetic wave is being propagated (e.g., being received or being transmitted). The impedance transition 1106 may include impedance matching elements 1108 which may include indents, outdents, steps with rounded corners, a first and second taper of each ridge of a dual ridge waveguide to support the transition to a coaxial waveguide, and other features which serve to match the impedance of the impedance transition 1106 to a hollow dual ridge waveguide or to a coaxial waveguide. It is also to be noted that impedance matching elements 1108 may further be matched to each other on opposing sides of the waveguide transition device 1100 (e.g., be symmetric or mirror images of each other). The waveguide transition device 1100 may further include a hollow waveguide port 1110.

The device may be constructed with metal additive manufacturing (i.e., metal three-dimensional printing). The device may be constructed upward relative to a build plate 1101, wherein the z-axis for purposes of metal additive manufacturing is orthogonal to the plane of the build plate 1101. The device may be designed to ensure all overhanging angles are oriented for an additive manufacturing process.

Figure 13:
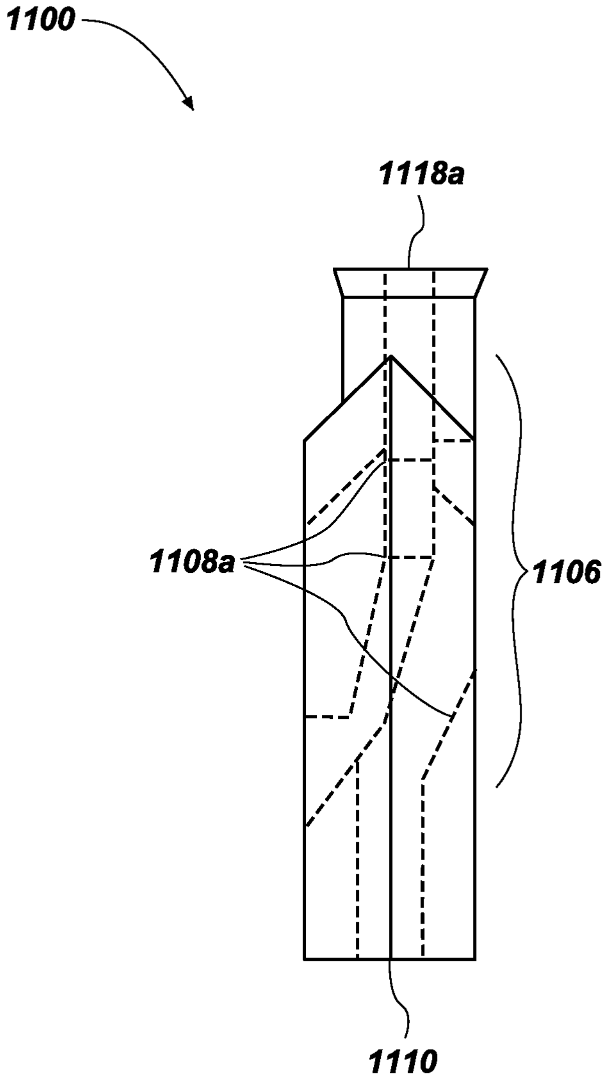
FIG. 13 illustrates a side view of a dual-ridge waveguide to dual coaxial waveguide output transition.

FIG. 13 illustrates a side view of a waveguide transition device 1100 comprising a hollow dual-ridge waveguide to dual circular coaxial waveguide output. The waveguide transition device 1100 may include a circular coaxial waveguide 1118*a* (e.g., a cross section of the coaxial waveguide outer conductor and inner conductor are circular) as shown in FIG. 11. The circular coaxial waveguide 1118*a* may be connected to a coaxial fed antenna array element. The second circular coaxial waveguide 1118*b* is not visible in FIG. 11 due to perspective. The waveguide transition device 1100 may further include an impedance transition 1106 which serves to match the impedance of the hollow dual ridge waveguide to the dual circular coaxial waveguide. The transition 1106 also acts as a power combiner or divider depending on which direction an electromagnetic wave is being propagated (e.g., being received or being transmitted). The impedance transition 1106 may include impedance matching elements 1108*a* and 1108*b* which may include indents, outdents, steps with rounded corners, a first and second taper of each ridge of a dual ridge waveguide to support the transition to a coaxial waveguide, and other features which serve to match the impedance of the impedance transition 1106 to a hollow waveguide or to a coaxial waveguide input/output. It is also to be noted that impedance matching elements 1108*a* and 1108*b* may further be matched to each other on opposing sides of the waveguide transition device 1100 (e.g., be symmetric or mirror images of each other). The waveguide transition device 1100 may further include a hollow waveguide port 1115.

Figure 14:
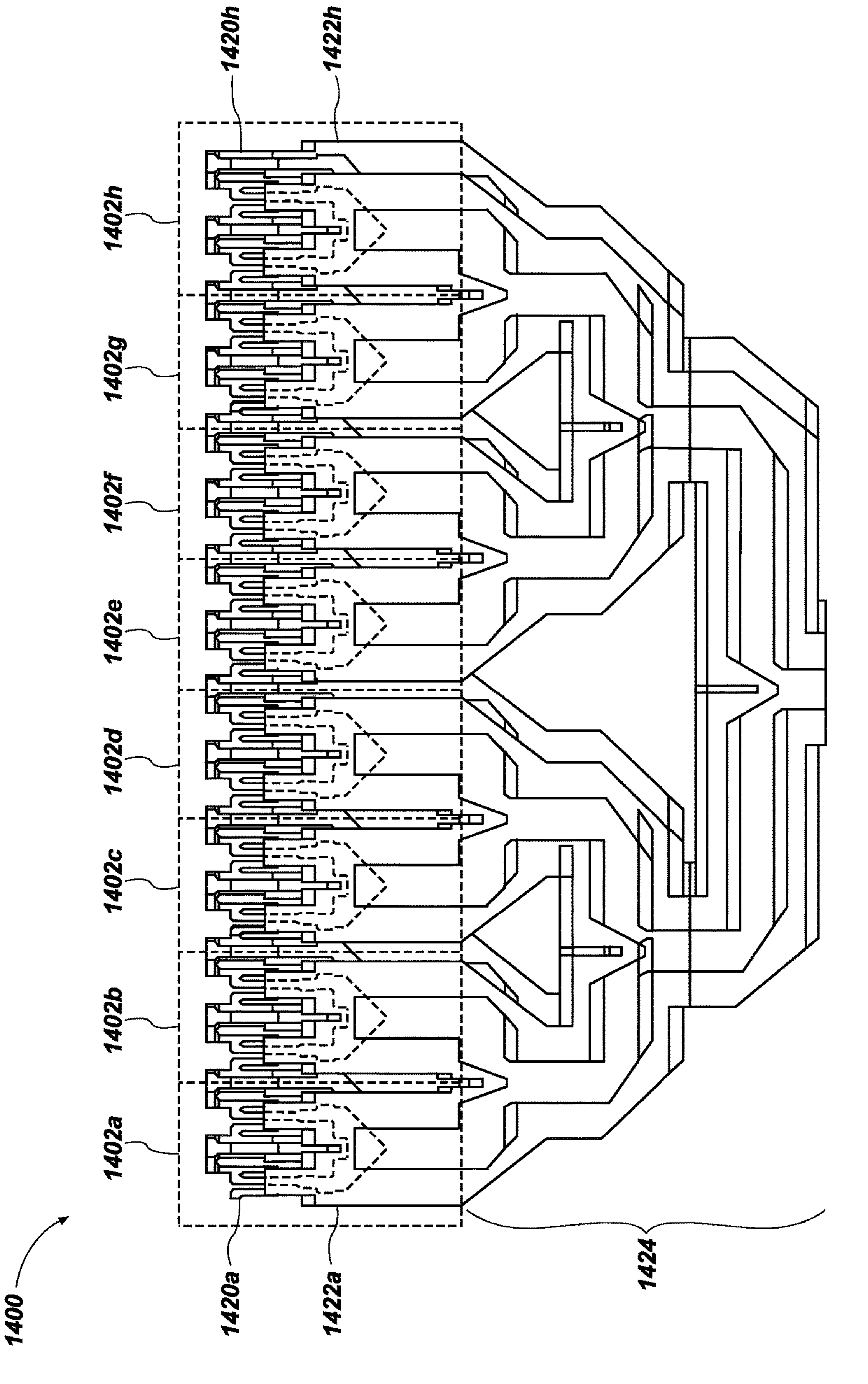
FIG. 14 illustrates a side view of an antenna array element and corporate combiner which incorporates a set of branched single ridge waveguide combiners to dual-coaxial waveguide transitions in a combiner/divider antenna element.

FIG. 14 illustrates a side view of an antenna array 1400 comprising a single combined row of an antenna array which incorporates a number of coaxial-fed antenna elements connected to the coaxial waveguide of the waveguide transition device 400 at 402*a* and 402*b* shown in FIG. 4, above, followed by a hollow single-ridge waveguide combiner network connected to single ridge waveguide port. FIG. 14 is an example of a waveguide combiner network attached to a waveguide-to-coax transition and a coaxial-fed radiating element with broad bandwidth. In an implementation, the element spacing is 0.5 wavelengths at the highest frequency, and this allows for electronic scanning in the y-axis (not illustrated, axis orthogonal to the plane of the figure or in the direction into and out of the image). FIG. 14 illustrates two rows of combiners feeding into a dual-polarized antenna element.

It is noted, for purposes of description that the transition may be implemented on side of antenna array 1400, that is not visible due to perspective in FIG. 14. As shown in FIG. 14, a plurality of the transitions 1402*a*-1402*h* are disposed on a combiner divider antenna element. Each one of transitions 1402*a*-1402*h* include a coaxial-fed antenna radiating element 1420*a*-1420*h* and an impedance transition 1422*a*-1422*h*. The plurality of transitions 1402*a*-1402*h* may further be connected by a series of hollow waveguide power combiners/dividers 1424 in a hollow waveguide combiner network. Also, as shown in FIG. 14, two rows of combiners (antenna elements 1400) are provided which feed a dual-polarized antenna element with each row of antenna elements operating in the E-plane or H-plane, as desired. As shown herein, a spacing between coaxial waveguide ports allows for antenna element spacing that is less than or equal to one wavelength of the working frequency of the antenna array and allows for an electronic scan in the direction orthogonal to the row over a wide bandwidth with spacing less than half a wavelength of the working frequency of the antenna array.

In an implementation, the antenna array is implemented with pairs of transitions that may have different components or orientations. For example, an antenna array may be manufactured that includes a pair of transitions from devices 100 and 400 illustrated herein; or a pair of transitions from devices 100 and 600 illustrated herein; or a pair of transitions from devices 100 and 900 illustrated herein; or a pair of transitions from devices 100 and 1100 illustrated herein. Any of the transition devices illustrated herein, including devices 100, 400, 600, 900, and 1100 may be paired with one another in any suitable combination. Additionally, same devices may be paired with one another such that an antenna array may include a pair of identical or mirror-image devices 1100 illustrated in FIG. 11. The device pairs may be selected to ensure that the coaxial waveguide ports are oriented in the desired direction. Accordingly, because the waveguide transition device 1100 is symmetrical, a pair of transitions may include two identical or mirror-image devices 1100. In another implementation, an antenna array may include a pair of devices include waveguide transition device 600 and waveguide transition device 900 as illustrated in FIG. 10. The transition embodiments may be selected based on whether the transition has asymmetries that use the rotation to achieve orientation with the radiating element.

Figure 15:
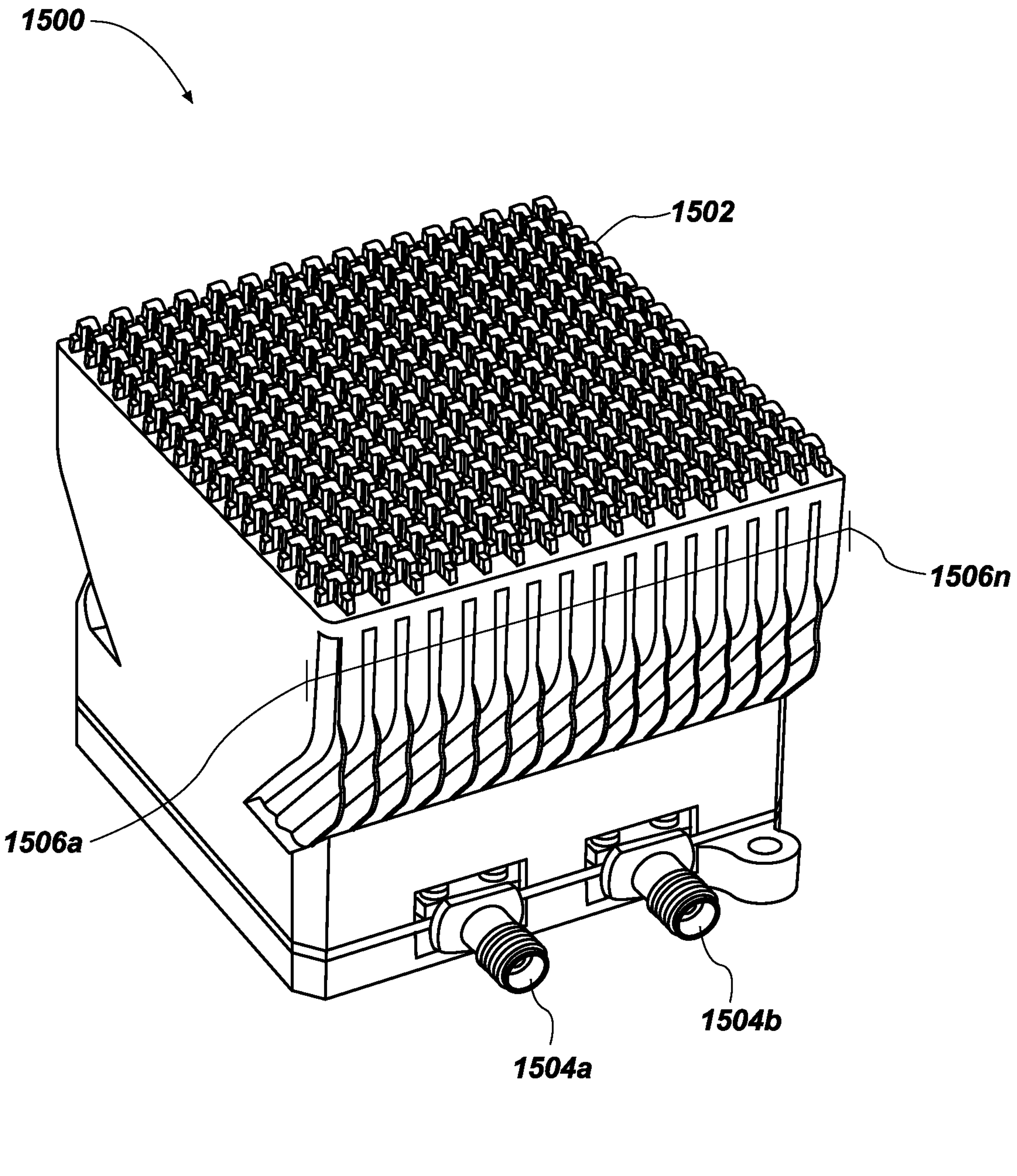
FIG. 15 illustrates fabricated dual-polarized array with combiner network and integrated transition from ridge waveguide to coaxial-fed antenna element at each combiner/divider antenna element.

FIG. 15 illustrates fabricated dual-polarized array 1500 with combiner network and integrated transition from ridge waveguide to coaxial waveguide at each combiner/divider antenna element. In an implementation, the spacing of the antenna elements allows for electronic scan in a single axis. The broad bandwidth of radiating elements allows for multi-band operation.

The array 1500 may incorporate the above mentioned waveguide elements, disclosed herein. For example, the array 1500 may include a plurality of radiating elements 1502 and coaxial inputs 1504*a*, 1504*b*. The array 1500 may further include a plurality of combiners (antenna elements 1400 as shown in FIG. 14 as representations of air volume) in a chassis produced by metal additive manufacturing techniques, as antenna elements 1506*a*-1506*n*. The array 1500 may be a dual-polarized array which incorporates a broad bandwidth radiating element for multi-band operation.

The array 1500 includes the plurality of radiating elements 1502 and located beneath the radiating elements 1502 (relative to the illustration in FIG. 15) are a plurality of waveguide combiner networks. The array 1500 combines the energy from each row of polarized radiating elements 1502 one row at a time. The energy from each of the radiating elements 1502 in a single row is combined to a single point. This enables improved backend processing for managing operations of the array 1500.

The array 1500 may be implemented as a phased array, which is an electronically scanned array with a computer-controlled array of antennas that create a beam of electromagnetic waves that can be electronically steered to point in different directions without moving the antennas. This is implemented by electronically altering the phase between radiating elements 1502 or between rows of radiating elements 1502. When the phase of the radiating element 1502 is changed, the beam of electromagnetic energy can point off-orthogonal to the antenna rather than perfectly orthogonal to the antenna. In this case, the antenna does not need to be physically or mechanically pointed and can instead be electrically pointed to a desired direction.

The antenna arrays described herein may be implemented in a phased array such as a passive phased array (PESA), an active electronically scanned array (AESA), a hybrid beam forming phased array, or a digital beam forming (DBF) array. The geometries of the elements in the array 1500 and the spacings between different elements in the array 1500 are optimized for combining electromagnetic energy from independent radiating elements 1502 to generate an electronically-controllable phased array.

Figure 16:
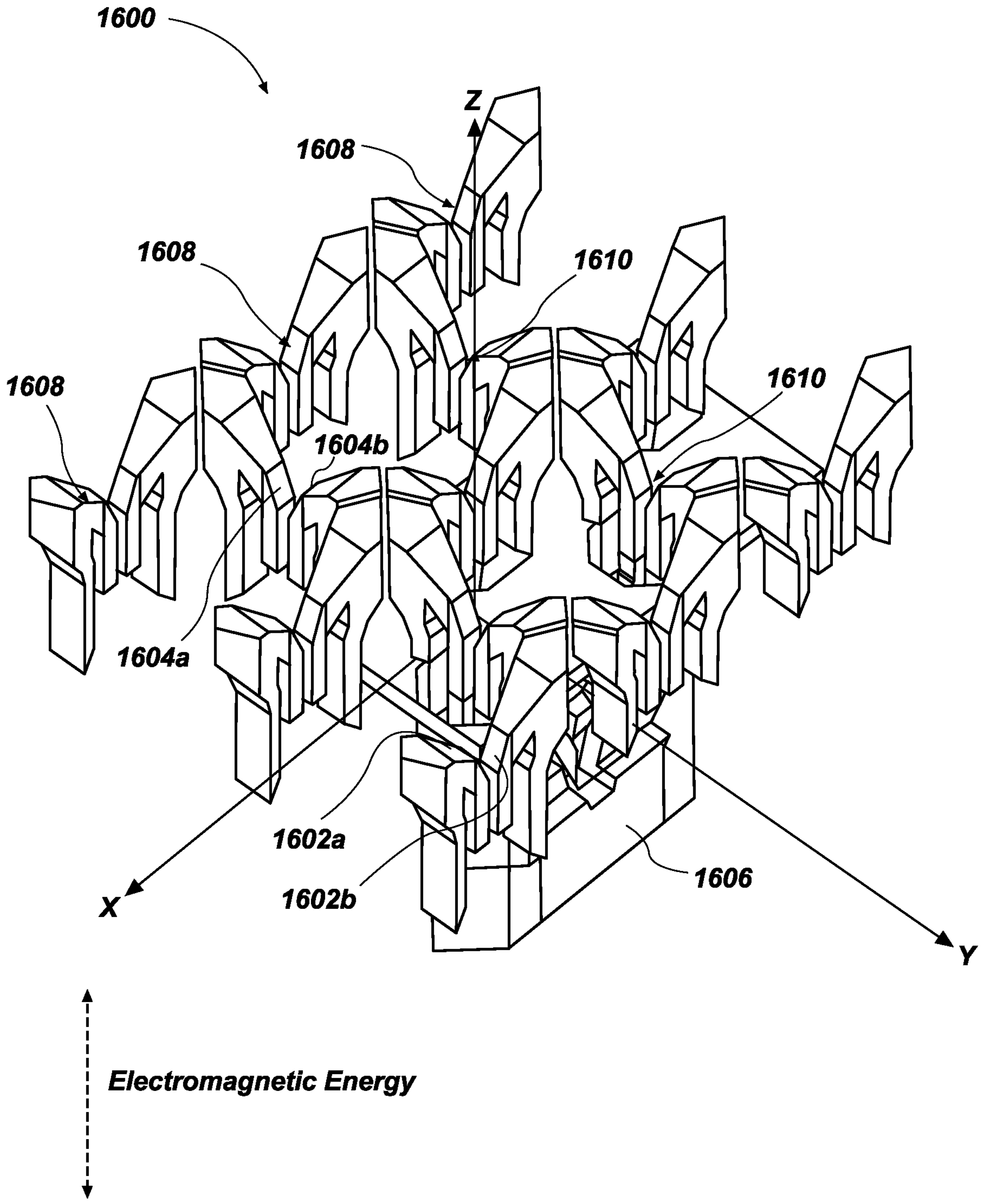
FIG. 16 illustrates an isometric view of an array of radiating elements fed by balanced twin-wire coaxial waveguide, where two waveguide feed sections are shown.

FIG. 16 illustrates an isometric view of an array 1600 comprising radiating elements fed by a waveguide. Only two waveguide feed sections are shown in FIG. 16. FIG. 16 is illustrated such that all components are depicted with solid lines, including solid components (e.g., the metal radiating components 1608) and also those components indicating the boundary of negative space wherein air can pass through.

The array 1600 receives or transmits electromagnetic energy through the waveguide transition device 1606 as illustrated. The waveguide transition device 1606 is incorporated in a waveguide transition device such as those illustrated in FIGS. 1-13 (see devices 100, 400, 600, 900, and 1100).

The array 1600 includes a plurality of radiating components 1608, 1610 such that each waveguide transition device feeds into one or more radiating components 1608, 1610. The radiating components 1608, 1610 are configured for receiving and transmitting electromagnetic energy. The array 1600 includes a plurality of first radiating components oriented at a "benchmark" orientation, which may be referred to herein as benchmark radiating components 1608. The array 1600 further includes a plurality of second radiating components oriented at an orthogonal orientation relative to the benchmark radiating components 1608, which may be referred to herein as orthogonal radiating components 1610. In the example illustrated in FIG. 16, the benchmark radiating components 1608 are oriented along the x-axis and the orthogonal radiating components 1610 are oriented along the y-axis, although it should be appreciated that any orientation is acceptable as long as the orthogonal radiating components 1610 comprise an orthogonal orientation relative to the benchmark radiating components 1608.

The orientations of the benchmark radiating components 1608 and the orthogonal radiating components 1610 determine the polarization of the electromagnetic waves that are received or transmitted by the radiating components 1608, 1610. Thus, the electromagnetic waves being transmitted or received by the benchmark radiating components 1608 comprise a polarization that is orthogonal to the polarization of the electromagnetic waves being transmitted or received by the orthogonal radiating components 1610. The radiating components 1608, 1610 support dual linear polarization.

The benchmark radiating components 1608 include radiating elements configured to receive or transmit electromagnetic energy though signal ears. Each of the signal ears is in communication with a coaxial waveguide of the waveguide transition device 1606. The radiating elements associated with a benchmark radiating component 1608 may be referred to as benchmark radiating elements 1602*a*, 1602*b* as discussed herein. As illustrated in FIG. 16, the benchmark radiating components 1608 are oriented along the x-axis and each include two benchmark radiating elements 1602*a*, 1602*b* as part of the signal ears that are also oriented along the x-axis.

The orthogonal radiating components 1610 also include radiating elements configured to receive or transmit electromagnetic energy though signal ears. Each of the signal ears is in communication with a coaxial waveguide of the waveguide transition device 1606. The radiating elements associated with an orthogonal radiating component 1610 may be referred to as orthogonal radiating elements 1604*a*, 1604*b* as discussed herein. As illustrated in FIG. 16, the orthogonal radiating components 1610 are oriented along the y-axis and each include two orthogonal radiating elements 1604*a*, 1604*b* as part of the signal ears that are also oriented along the y-axis.

The array 1600 is constructed such that a single waveguide transition device 1606 feeds two pairs of radiating components including a first radiating component comprising a first pair of radiating elements and a second radiating component comprising a second pair of radiating elements. The spacings between the individual radiating elements, the pairs of radiating elements, and the waveguide transition devices are optimized to maintain the desired λ (lambda) spacing at the top frequencies of operation.

In an implementation, a single waveguide transition device 1606 feeds two pairs of radiating components of the same orientation. Thus, a single waveguide transition device 1606 is configured for one type of polarization, and neighboring waveguide transition devices may be configured for an orthogonal polarization. The single waveguide transition device therefore ultimately feeds four independent radiating elements (and signal ears) that are tuned to the same polarization.

The array 1600 can be implemented as a phased array. Phased arrays offer numerous advantages by providing reduced total swept volume and rapid beam scanning. Phased arrays are used in military and commercial applications such as wireless communication systems and radar systems. The main purpose of a phased array antenna is to scan a wide angular range with high array gain without mechanically pointing the array. Generally, the spacing between radiating components 1608, or equivalently 1610, in both the x- and y-axes within a phased array antenna is limited to 0.5λ or less to avoid performance problems caused by grating lobes. However, in the array 1600 described herein, the spacing between the radiating elements 1602, 1604 is optimized at 0.5λ but may extend up to 1.0λ. The spacing cannot exceed 1.0λ without suffering significant performance degradation.

Figure 17:
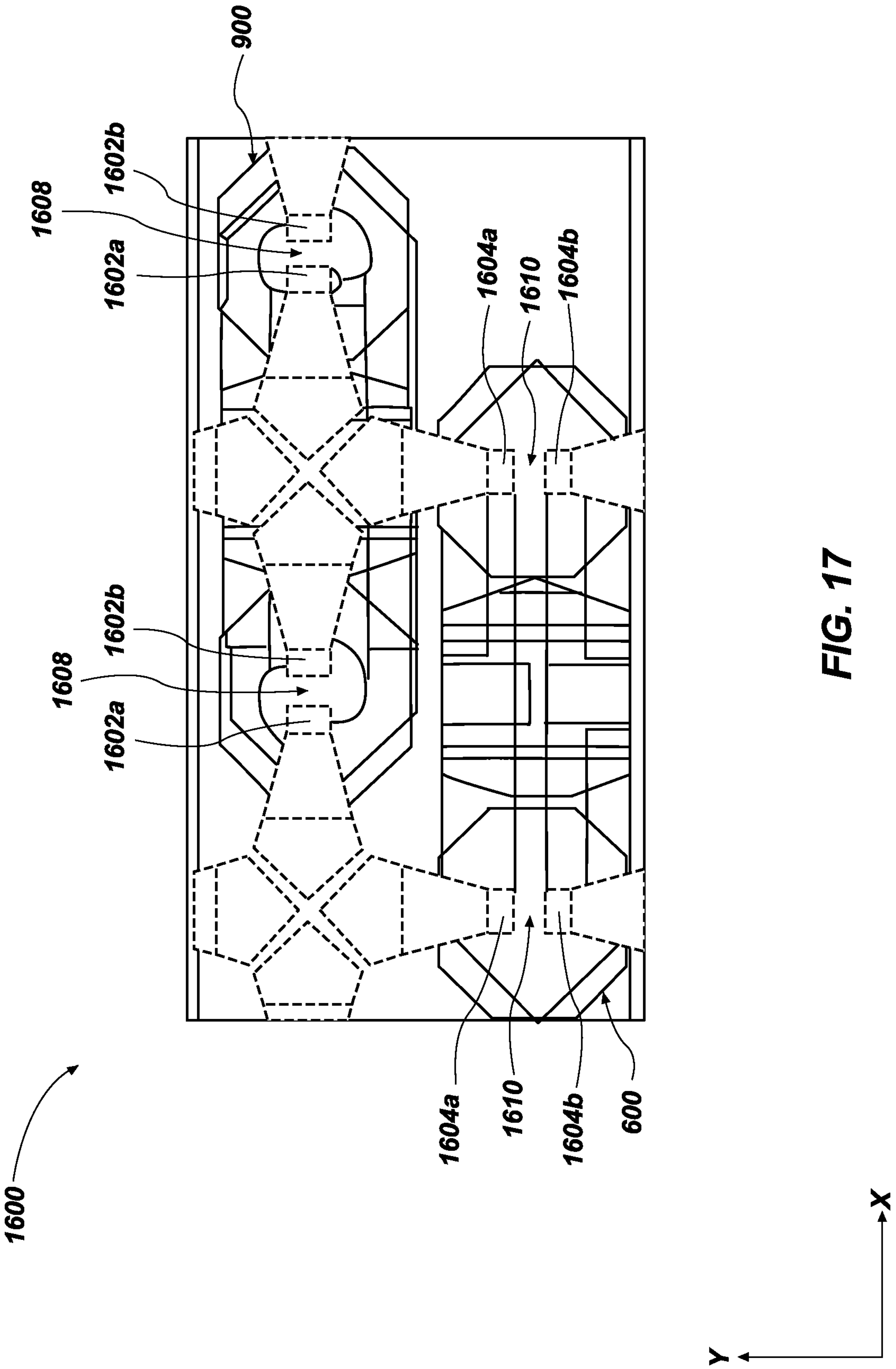
FIG. 17 illustrates a top-down view of an array of radiating elements fed by balanced twin-wire coaxial waveguide.

FIG. 17 illustrates a top-down view of the array 1600 first illustrated in FIG. 16. FIG. 17 is illustrated such that the dotted lines represent solid components (may be constructed of metal), and non-dotted lines represent the outline of negative space. The negative space is empty such that air can pass through.

The array 1600 includes a waveguide transition device 600 comprising a hollow dual-ridge waveguide to dual twin-wire balanced coaxial waveguide such as the waveguide transition device 600 first illustrated in FIG. 6. The array 1600 further includes a waveguide transition device 900 comprising a hollow dual-ridge waveguide to dual twin-wire balanced coaxial waveguide with a helical twist twin-wire coaxial waveguide such as the waveguide transition device 900 first illustrated in FIG. 9. The illustration depicted in FIG. 17 includes the two waveguide devices each feeding into two pairs of radiating elements.

As illustrated in FIG. 17, the waveguide transition device 900 feeds into radiating components 1608 oriented along the x-axis, which may be referred to as the benchmark radiating components 1608 for purposes of discussion. The waveguide transition device 600 feeds into radiating components 1610 oriented along the y-axis, which may be referred to as the orthogonal radiating components 1610 for purposes of discussion.

The waveguide transition device 900 feeds into two benchmark radiating components 1608 as shown in FIG. 17. Each of the two benchmark radiating components 1608 includes two benchmark radiating elements 1602*a*, 1602*b*. The waveguide transition device 600 feeds into two orthogonal radiating components 1610 as shown in FIG. 17. Each of the two orthogonal radiating components 1610 includes two orthogonal radiating elements 1604*a*, 1604*b*. The waveguide transition devices 600, 900 may be selected such that the coaxial waveguides comprise orthogonal orientations relative to one another. The coaxial waveguides may thereby feed into radiating components that are orthogonal relative to one another and may thereby receive and transmit electromagnetic radiation with orthogonal polarization. The arrays described herein support dual linear polarization by integrating orthogonally-polarized waveguide transition devices within a single antenna array.

The electromagnetic energy that is propagated through the coaxial waveguides are radiated out by the radiating elements 1602, 1604 at the desired amplitude and phase. This results in an efficient planar radiation geometry in free-space. In the reverse implementation, wherein electromagnetic energy is received by the array 1600, the electromagnetic energy radiates through free-space and is received by the radiating elements 1602, 1604 and then propagated through the coaxial waveguides.

The array 1600 may be referred to as a sub-array, or a single portion of a large-scale antenna array. The array 1600 may be duplicated in the x- and y-directions an unlimited number of times depending on the application. In an implementation, the array 1600 is duplicated a number of times equal to a power of 2, such as 2, 4, 8, 16, 32, 64, 128, 256, 512, or 1024 times, and so forth. The performance of the individual arrays 1600 will be impacted by the performance of surrounding arrays 1600 within a large-scale antenna array.

Figure 18:
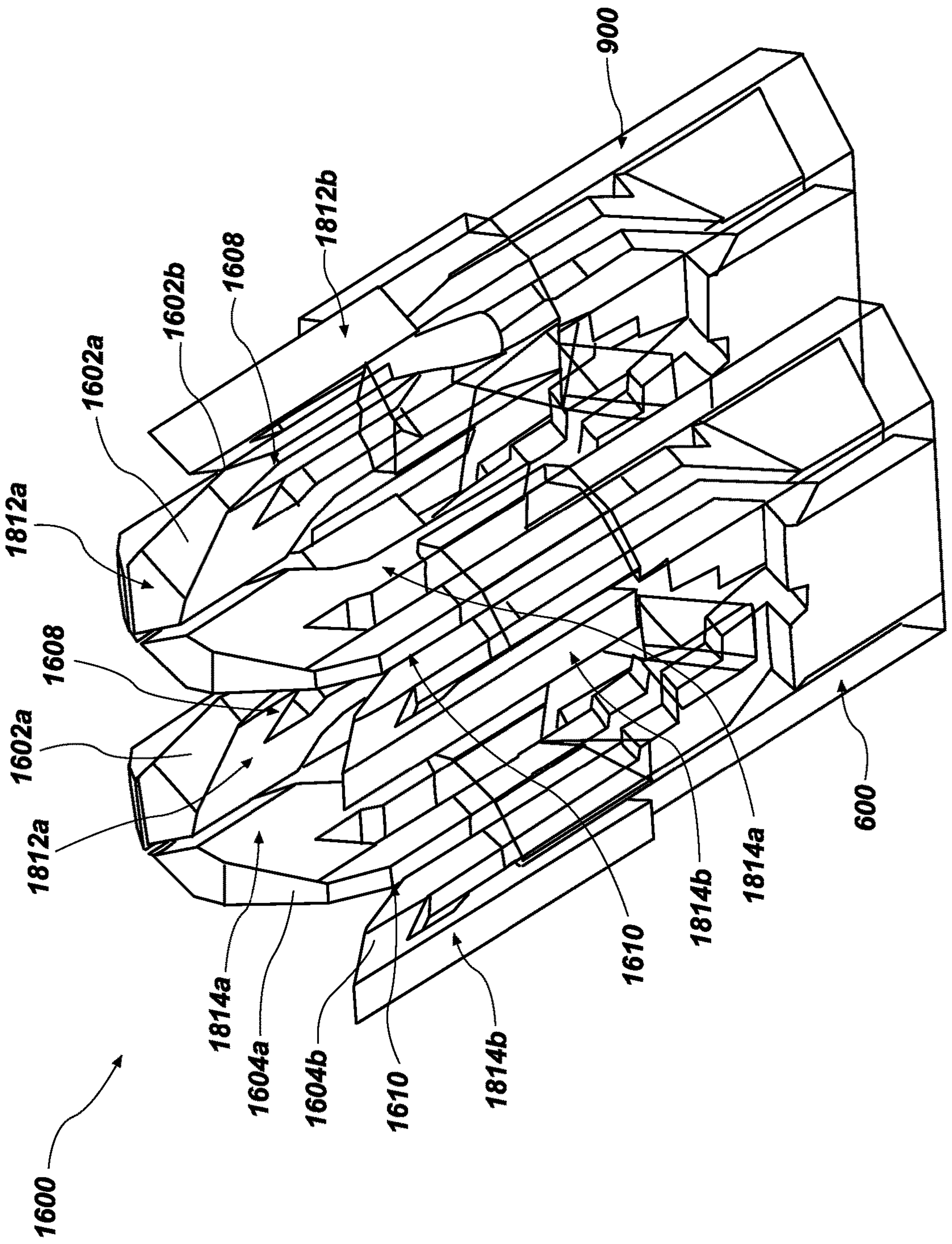
FIG. 18 illustrates an isometric view of an array of radiating elements fed by balanced twin-wire coaxial waveguide.

FIG. 18 illustrates an isometric view of the array 1600 also illustrated in FIGS. 16 and 17. As shown in FIG. 18, the array includes two waveguide devices, including the waveguide transition device 600 comprising a hollow dual-ridge waveguide to dual twin-wire balanced coaxial waveguide such as the waveguide transition device 600 first illustrated in FIG. 6. The array 1600 further includes the waveguide transition device 900 comprising a hollow dual-ridge waveguide to dual twin-wire balanced coaxial waveguide with a helical twist twin-wire coaxial waveguide such as the waveguide transition device 900 first illustrated in FIG. 9.

Consistent with the illustration presented in FIG. 17, the waveguide transition device 600 feeds into two orthogonal radiating components 1610 and the waveguide transition device 900 feeds into two benchmark radiating components 1608. The waveguide transition device 600 therefore feeds into four orthogonal radiating elements 1604*a*, 1604*b* and the waveguide transition device 900 feeds into four benchmark radiating elements 1602*a*, 1602*b*.

The radiating components 1608, 1610 include signal ears. The radiating elements 1602, 1604 are configured to receive or transmit electromagnetic energy through the signal ears. Each of the signal ears is in communication with a coaxial waveguide. Each of the benchmark radiating components 1608 includes two signal ears, which may be referred to herein as benchmark signal ears 1812*a*, 1812*b* for purposes of discussion. Each of the orthogonal radiating components 1610 includes two signal ears, which may be referred to herein as orthogonal signal ears 1814*a*, 1814*b* for purposes of discussion.

Each of the signal ears 1812*a*, 1812*b*, 1814*a*, 1814*b* is in communication with a coaxial waveguide such as those coaxial waveguides illustrated herein (see, e.g., 102*a*, 102*b* first illustrated in FIG. 1; 402*a*, 402*b* first illustrated in FIG. 4; 602*a*, 602*b* first illustrated in FIG. 6; and 902*a*, 902*b* first illustrated in FIG. 9.) A pair of coaxial waveguides therefore feeds into a pair of signal ears. Each signal ear 1812*a*, 1812*b*, 1814*a*, 1814*b* includes a signal portion (the "top" portion disposed in a positive z-axis direction relative to the waveguide device and the build plate) and a grounding portion. The signal portion receives and transmits an electromagnetic energy signal. The grounding portion physically contacts the waveguide transition device (see e.g., 100, 400, 600, 900, 1100) to ground the signal ear with the subarray body and provides physical support and contact for fabrication of the ear using additive manufacturing.

The array 1600 is constructed such that there is a physical connection from the waveguide ridge to the grounding portion of a signal ear 1812*a*, 1812*b*, 1814*a*, 1814*b*. The physical connection between the grounding portion of the signal ears 1812*a*, 1812*b*, 1814*a*, 1814*b* and the subarray body (or waveguide transition device) enables numerous benefits. One benefit is realized during manufacturing and enables the waveguide transition device and the attached radiating components to be constructed of a single piece of metal using metal additive manufacturing. This increases the overall strength and structural stability of the array. Additionally, the physical connection between the grounding portion and the subarray body increases performance of the array by increasing the amount of electromagnetic energy that is received or transmitted by the array.

Figure 19:
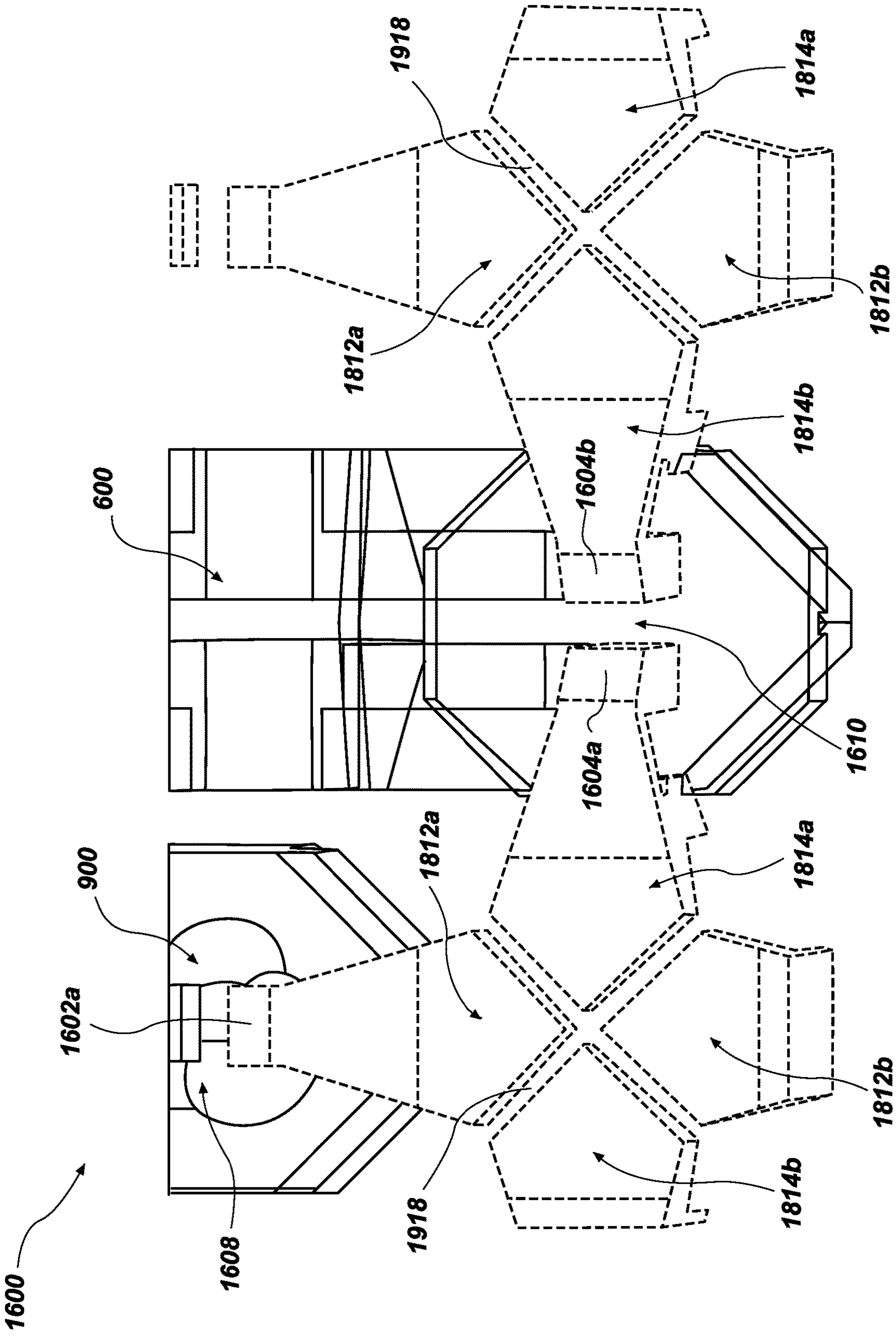
FIG. 19 illustrates a top-down view of a portion of an array of radiating elements fed by balanced twin-wire coaxial waveguide.

FIG. 19 illustrates a top-down view of a portion of the array 1600 first illustrated in FIG. 16. FIG. 19 is illustrated such that the dotted lines represent solid components (may be constructed of metal), and non-dotted lines represent the outline of negative space. The negative space is empty such that air can pass through.

FIG. 19 specifically illustrates a portion of the waveguide transition device 600 feeding into an orthogonal radiating component 1610 comprising a first orthogonal radiating element 1604*a* and a second orthogonal radiating element 1604*b*. FIG. 19 further illustrates a portion of the waveguide transition device 900 feeding into a benchmark radiating component 1608 comprising a first benchmark radiating element 1602*a* and a second benchmark radiating element 1602*b* (not shown). The orthogonal radiating component 1610 includes a first orthogonal signal ear 1814*a* and a second orthogonal signal ear 1814*b*. The benchmark radiating component 1608 includes a first benchmark signal ear 1812*a* and a second benchmark signal ear 1812*b* (not shown attached to the waveguide transition device 900).

The ports of the coaxial waveguides 602*a*, 602*b* from the waveguide transition device 600 feed into the orthogonal signal ears 1814*a*, 1814*b*. The ports of the coaxial waveguides 902*a*, 902*b* feed into the benchmark signal ears 1812*a*, 1812*b*. The pairs of signal ears 1812, 1814 include independent signal ears wherein each signal ear is in communication with a different coaxial waveguide.

The signal ears 1812*a*, 1812*b*, 1814*a*, 1814*b* approach one another and form a signal ear grouping. The signal ear grouping comprising two benchmark signal ears 1812 and two orthogonal signal ears 1814. The distance between the signal ears within the signal ear grouping is referred to as a capacitive gap 1918. The capacitive gap 1918 enables the array 1600 to support a broad frequency bandwidth of operation. In a typical implementation, this may include greater than 3:1 bandwidth (meaning the upper frequency of operation is greater than 3× the lower frequency of operation). The capacitive gap 1918 is included in embodiments wherein the broad frequency bandwidth of operation is needed or desired. In alternative implementations, it is not desirable to have a broad frequency bandwidth of operation, and in these implementations, the capacitive gap 1918 may be eliminated such that the signal ears 1812*a*, 1812*b* 1814*a*, 1814*b* forming the signal ear grouping physically touch one another (see, e.g., FIG. 23). It should be appreciated that any of the embodiments described herein may be implemented with or without the capacitive gap depending on the implementation.

Figure 20:
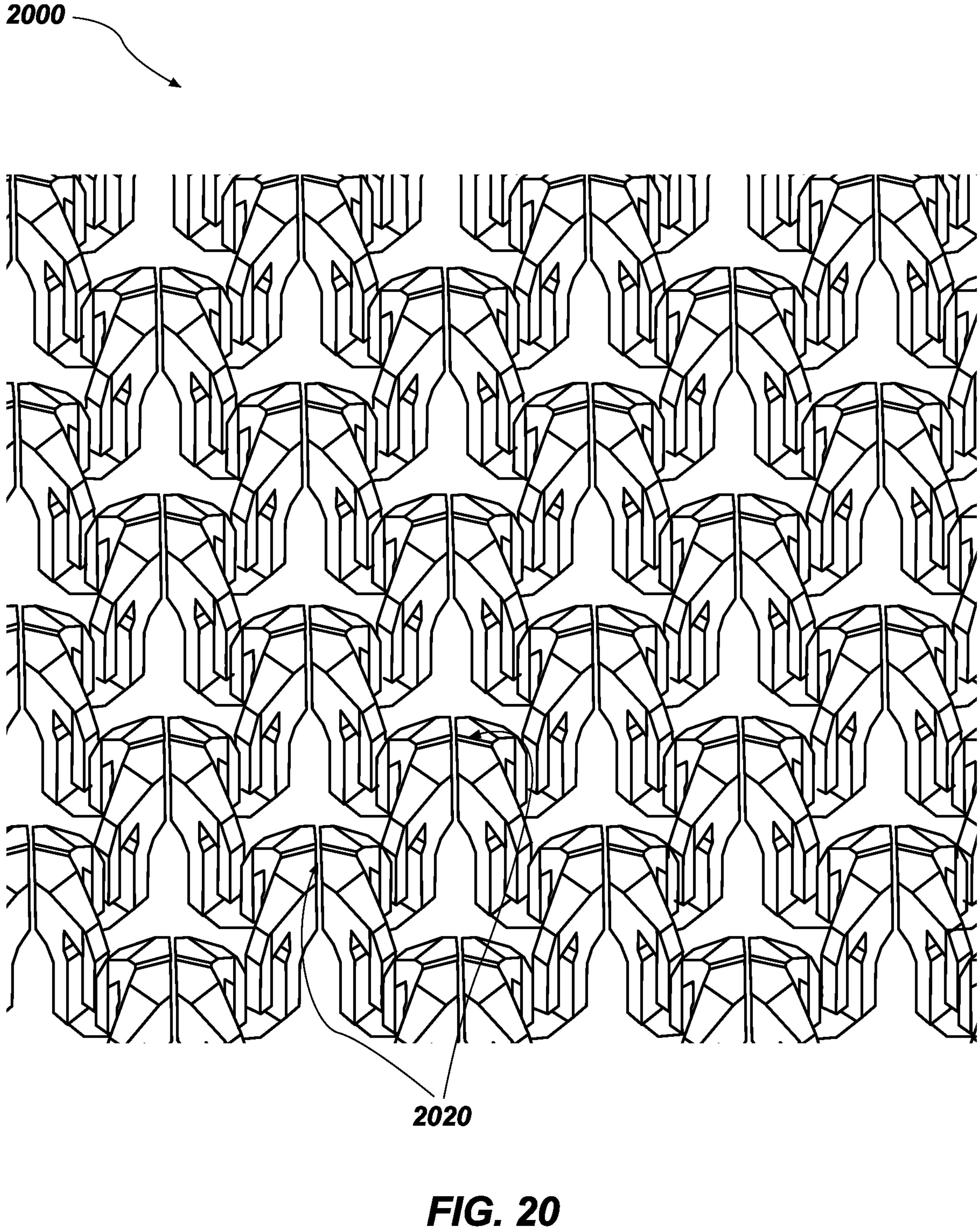
FIG. 20 illustrates an isometric view of an array of radiating elements fed by balanced twin-wire coaxial waveguide.

FIG. 20 illustrates an isometric view of an antenna array 2000 comprising a plurality of arrayed elements. In FIG. 20, the waveguides and transitions are omitted from the illustration and only the metal face of the antenna array 2000 forming the radiating components is shown. The metal face of the antenna array 2000 includes a plurality of groupings of radiating components wherein four signal ears approach one another to form a signal ear grouping 2020. The metal face of the antenna array 2000 further includes a plurality of coaxial waveguide regions wherein the metal signal ears 1812*a*, 1812*b*, 1814*a*, 1814*b* communicate with a waveguide transition device (see, e.g., devices 100, 400, 600, 900, 1100; not shown in FIG. 2000) as discussed herein.

Figure 21:
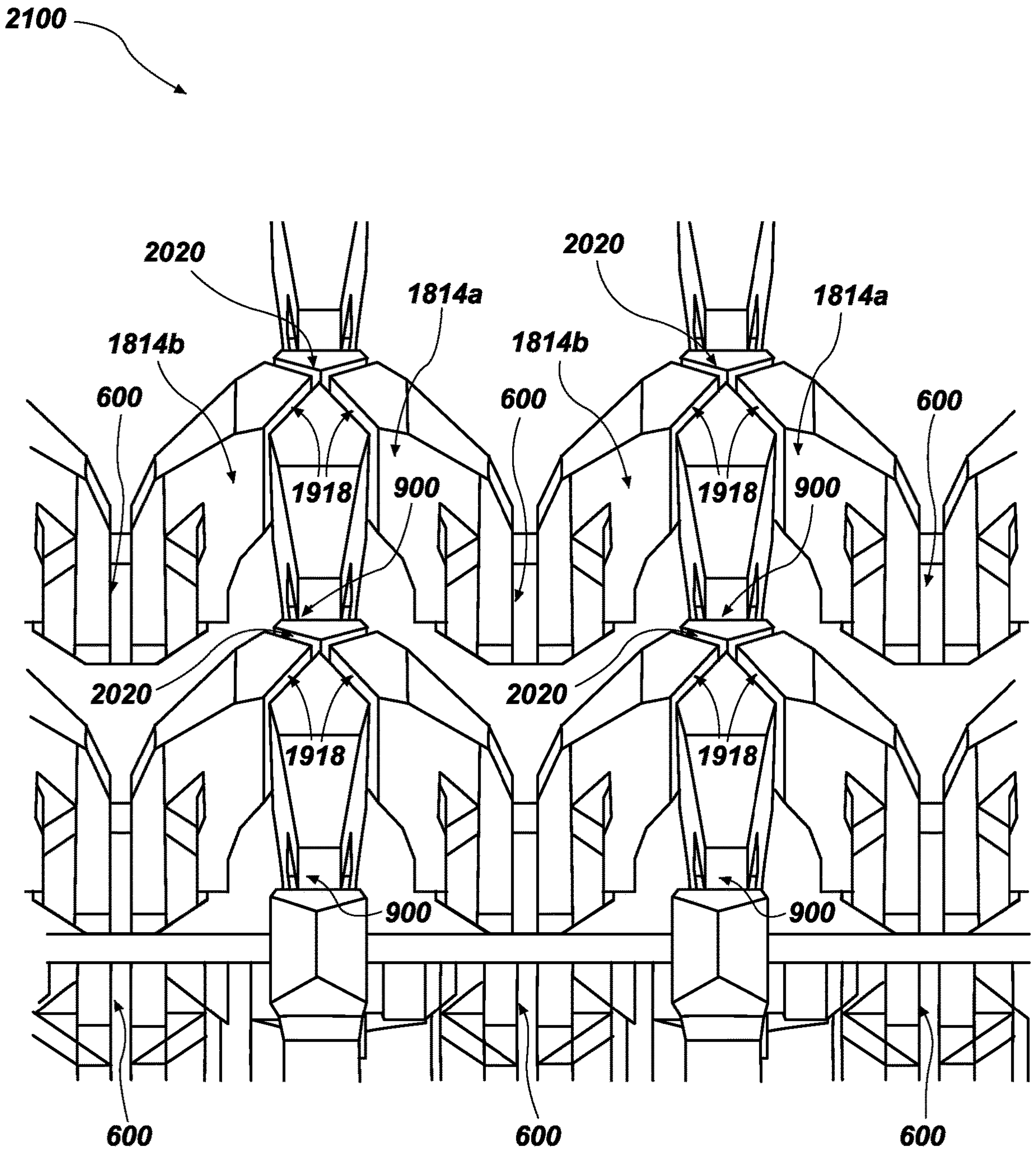
FIG. 21 illustrates an isometric view of an array of radiating elements fed by balanced twin-wire coaxial waveguide.

FIG. 21 illustrates an isometric view of an antenna array 2100. The antenna array is arranged in rows such that the radiating components of adjacent waveguide transition devices are orthogonal relative to one another. In the implementation illustrated in FIG. 21, one row of waveguide transition devices includes a series of waveguide transition devices 600 and an adjacent row of waveguide transition devices includes a series of waveguide transition devices 900. In this implementation, one row of waveguide transition devices includes a hollow dual-ridge waveguide to dual twin-wire balanced coaxial waveguides; and an adjacent row of waveguide transition devices includes a hollow dual-ridge waveguide to dual twin-wire balanced coaxial waveguide with a helical twist twin-wire coaxial waveguide. The helical twist twin-wire coaxial waveguide enables a 90-degree shift in orientation over a short distance. Thus, when a waveguide with a helical twist is adjacent to a waveguide with no helical twist, the waveguides will be orthogonal to each other, and the radiating elements extending from the waveguides can also be orthogonal to one another. In an implementation, all pairs of radiating elements are orthogonal to the nearest pair of radiating elements (in the implementation illustrated in FIG. 21, the nearest pair of radiating elements is located diagonally relative to the x-axis rows of antennas).

Figure 22:
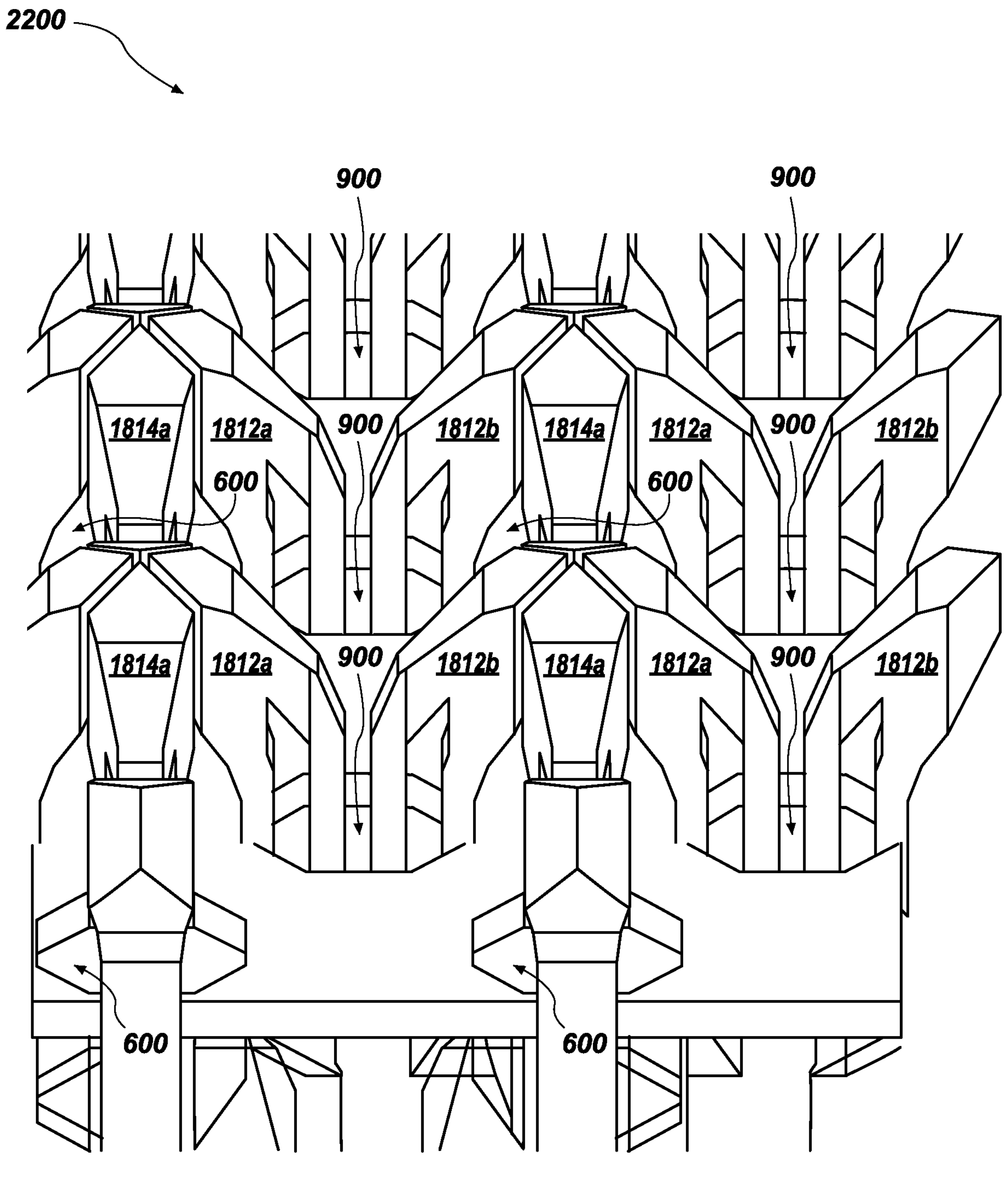
FIG. 22 illustrates an isometric view of an array of radiating elements fed by balanced twin-wire coaxial waveguide.

FIG. 22 illustrates an isometric view of an antenna array 2200. The antenna array comprises a plurality of waveguide transition devices (see, e.g., 100, 400, 600, 900, 1100) arranged in a checkerboard pattern and connected with metal radiating components. In the implementation illustrated in FIG. 22, the waveguide transition devices 600, 900 are arranged in a checkerboard pattern such that the nearest waveguide transition device is always orthogonal. For example, the nearest waveguide transition device to a waveguide transition device 600 is always a waveguide transition device 900. The waveguide transition device 600 does not include a helical twist and the waveguide transition device 900 includes a helical twist. This ensures that the electromagnetic energy radiated from the radiating elements which propagated through the waveguide transition device 900 is orthogonal to the electromagnetic energy radiated through the radiating elements which propagated through the waveguide transition device 600. The waveguide transition devices feed into the radiating elements 1812*a*, 1812*b*, 1814*a*, 1814*b* (not illustrated in FIG. 22). Thus, when the nearest-neighbor waveguide transition devices are orthogonal, the nearest-neighbor radiating element outputs will also be orthogonal. This enables a dual linearly polarized antenna in a single aperture.

Figure 23:
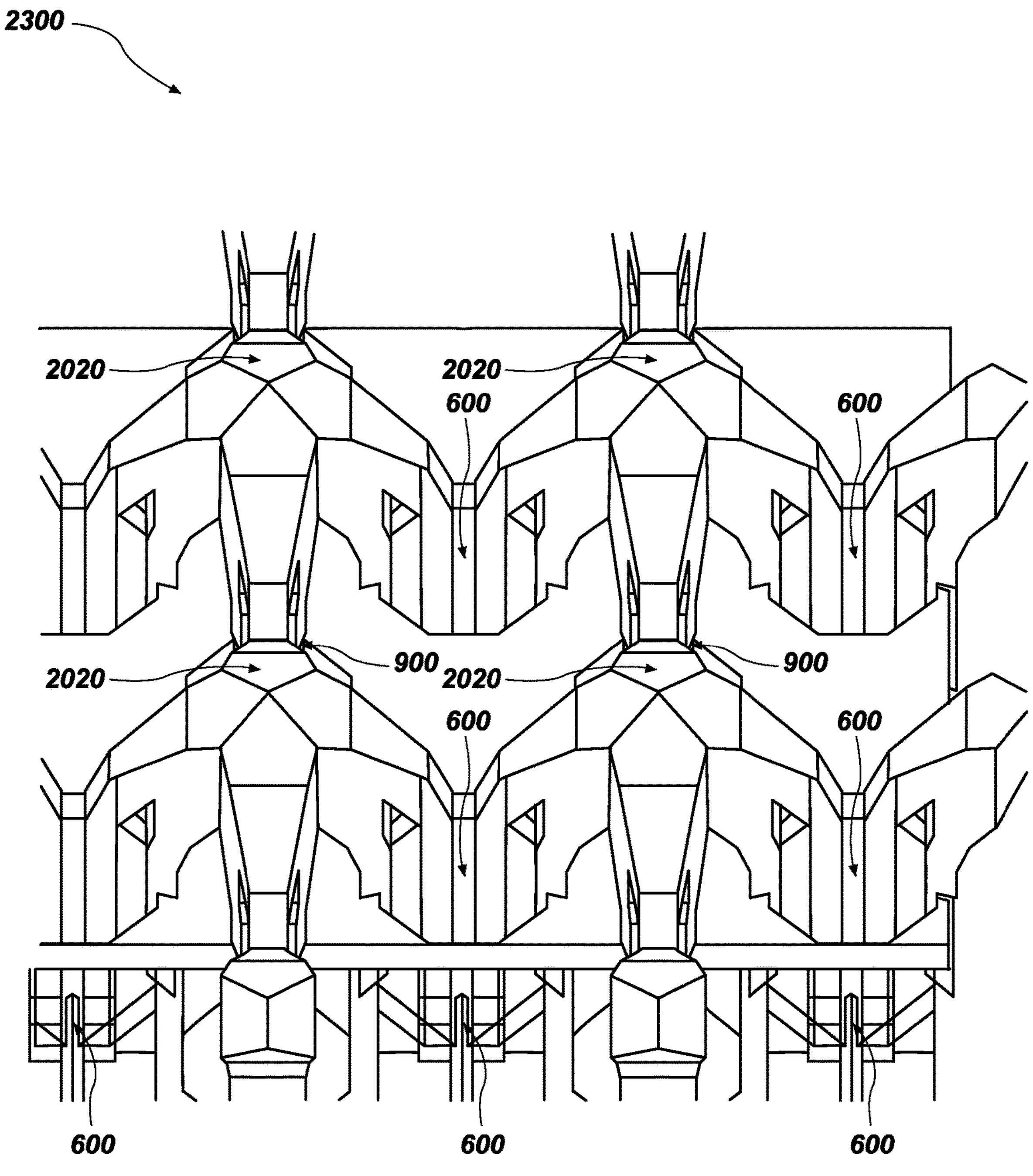
FIG. 23 illustrates an isometric view of an array of radiating elements fed by balanced twin-wire coaxial waveguide.

FIG. 23 illustrates an isometric view of an antenna array 2300. The antenna array 2300 is similar in implementation to the antenna array 2100 illustrated in FIG. 21. The antenna array 2300 illustrated in FIG. 23 is arranged such that the signal ear groupings 2020 are "closed" and do not include a capacitive gap 1918. In this implementation, the signal ears 1812*a*, 1812*b*, 1814*a*, 1814*b* of adjacent radiating components are physically touching such that there is no capacitive gap 1918. By contrast, in the antenna array 2100 illustrated in FIG. 21, the signal ears 1812*a*, 1812*b*, 1814*a*, 1814*b* are arranged to provide a capacitive gap 1918 between radiating components.

Figure 24:
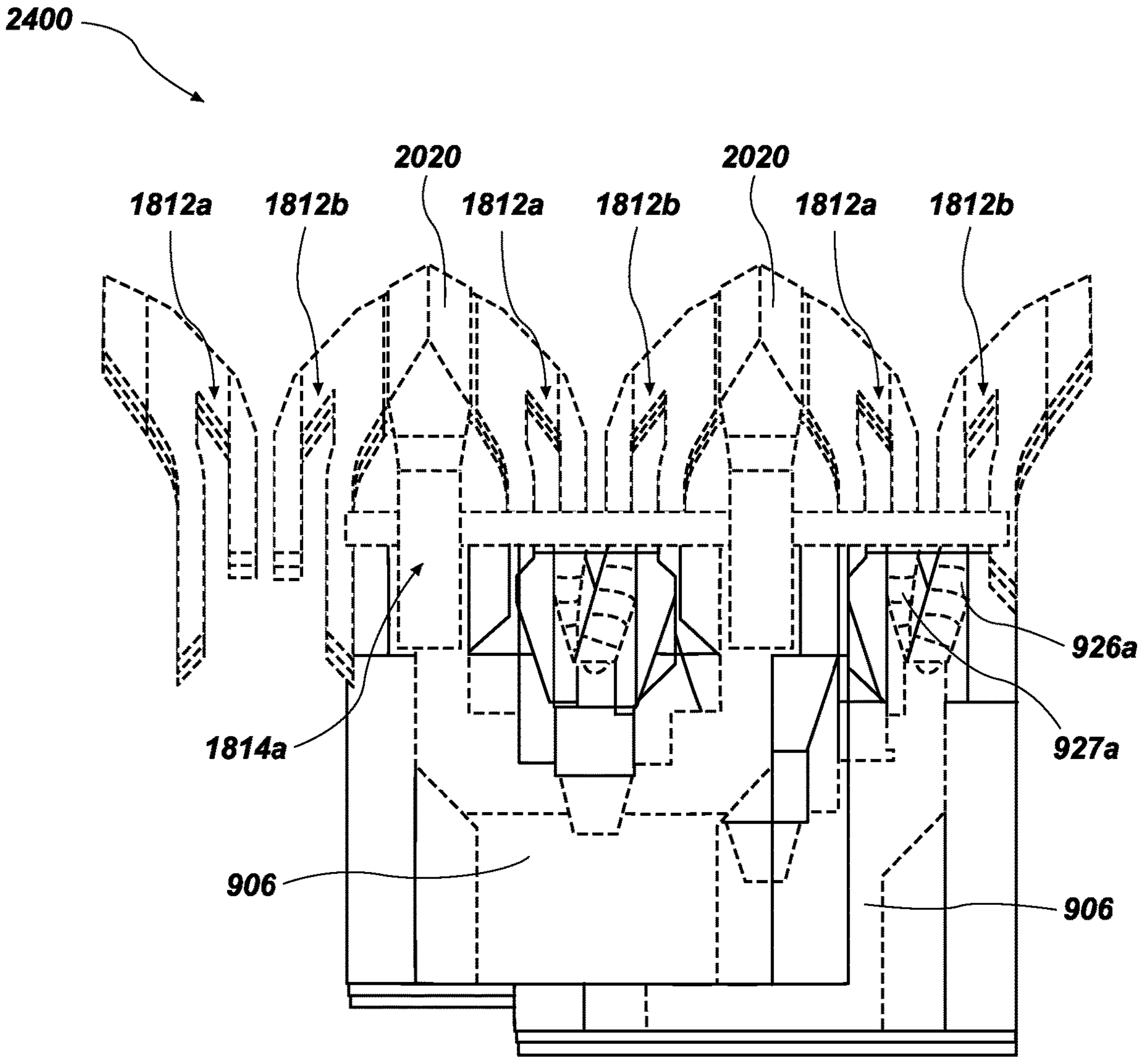
FIG. 24 illustrates an isometric view of an array of radiating elements fed by balanced twin-wire coaxial waveguide.

FIG. 24 illustrates a side view of an antenna array 2400. FIG. 24 is illustrated such that the dotted lines represent solid components (may be constructed of metal), and non-dotted lines represent the outline of negative space. The negative space is empty such that air can pass through.

The antenna array 2400 includes rows of waveguide transition devices feeding into metal radiating components. The antenna array 2400 is arranged such that one row of waveguide transition devices exclusively includes a certain type of waveguide transition device (see e.g., 100, 400, 600, 900, or 1100 as illustrated herein). An adjacent row of waveguide transition devices may include a different type of waveguide transition device such that adjacent rows are orthogonal relative to one another. In another embodiment, adjacent rows of waveguide transition devices include the same type as transition device. For example, an antenna array may include only rows of waveguide transition device 1100 because waveguide transition device 1100 has symmetrical inner and outer conductors on the coaxial waveguide.

In FIG. 24, the antenna array 2400 includes rows of waveguide transition device 900 and further includes rows of waveguide transition device 600. The rows with waveguide transition devices 900 and 600 radiate orthogonally relative to one another. The antenna array 2400 could alternatively include rows with different types of waveguide transition devices 100, 400, 600, 900, 1100 as discussed herein.

In the implementation illustrated in FIG. 24, the signal ear groupings 2020 are arranged such that the independent signal ears 1812*a*, 1812*b*, 1814*a*, 1814*b* are touching one another. This implementation may be preferred when the antenna array 2400 is implemented over a narrow bandwidth. In a typical implementation, a narrow bandwidth is less than 3:1 bandwidth (meaning the upper frequency of operation is less than 3× the lower frequency of operation).

Examples

The following examples pertain to further embodiments.

Example 1 is a device. The device includes a hollow waveguide port; two or more coaxial waveguide ports; and a transition disposed between the waveguide port and the two or more coaxial waveguide ports, wherein the transition combines or divides electromagnetic energy.

Example 2 is a device as in Example 1, wherein the transition combines or divides the electromagnetic energy based on a direction of the electromagnetic energy propagating through the device, and wherein: the transition combines the electromagnetic energy propagating from the two or more coaxial waveguide ports through the transition to the hollow waveguide port; and the transition divides the electromagnetic energy propagating from the hollow waveguide port through the transition to the two or more coaxial waveguide ports.

Example 3 is a device as in any of Examples 1-2, wherein the transition is an impedance transition and comprises one or more impedance matching elements.

Example 4 is a device as in any of Examples 1-3, wherein the transition is an impedance transition and comprises a plurality of impedance matching elements, and wherein two or more of the plurality of impedance matching elements are mirror images of one another.

Example 5 is a device as in any of Examples 1-4, wherein the hollow waveguide port is configured to connect to a hollow waveguide configured to propagate the electromagnetic energy.

Example 6 is a device as in any of Examples 1-5, wherein the two or more coaxial waveguide ports are spaced apart from one another with spacing less than or equal to one wavelength of the working frequency to allow for an antenna element to be disposed between the two or more coaxial waveguide ports.

Example 7 is a device as in any of Examples 1-6, wherein the two or more coaxial waveguide ports are spaced apart from one another with spacing less than or equal to 0.5 wavelengths of the working frequency to allow for an electronic scan over a bandwidth.

Example 8 is a device as in any of Examples 1-7, wherein at least one of the two or more coaxial waveguide ports comprises a rectangular geometry for either the inner conductor or the outer conductor.

Example 9 is a device as in any of Examples 1-8, wherein at least one of the two or more coaxial waveguide ports comprises an elliptical geometry for either the inner conductor or the outer conductor.

Example 10 is a device as in any of Examples 1-9, wherein at least one of the two or more coaxial waveguide ports comprises a twin-wire balanced coaxial waveguide port for feeding a twin-wire balanced antenna array radiating element.

Example 11 is a device as in any of Examples 1-10, wherein the twin-wire balanced coaxial waveguide port comprises coaxial twin-wire in a helical twist formation.

Example 12 is a device as in any of Examples 1-11, wherein the two or more coaxial waveguide ports comprise an orthogonal offset of the inner conductor relative to one another such that a first coaxial inner conductor is oriented in a first orientation and a second coaxial inner conductor is oriented in a second orientation, wherein the second orientation is orthogonal to the first orientation.

Example 13 is a device as in any of Examples 1-12, wherein at least one of the two or more coaxial waveguide ports comprises two inner conductor wires and a helical transition wherein the two inner conductor wires comprise a helical twist formation.

Example 14 is a device as in any of Examples 1-13, wherein the helical transition rotates the two inner conductor wires to an orthogonal orientation.

Example 15 is a device as in any of Examples 1-14, further comprising a hollow dual ridge waveguide, wherein the hollow dual ridge waveguide comprises a taper to support transition of the electromagnetic energy from the hollow dual ridge waveguide to the transition.

Example 16 is a device as in any of Examples 1-15, wherein the transition comprises an offset such that the transition operates in one or more of an E-plane or an H-plane.

Example 17 is a device as in any of Examples 1-16, wherein the transition is constructed of metal using metal additive manufacturing.

Example 18 is a device as in any of Examples 1-17, wherein the two or more coaxial waveguide ports are configured to receive the electromagnetic energy from a radiating element of an antenna, and wherein the transition is configured to transition the electromagnetic energy from the radiating element of the antenna to a low loss passive hollow waveguide combiner.

Example 19 is a device as in any of Examples 1-18, wherein the transition is configured to transition the electromagnetic energy from a TE10 mode of a hollow single ridge waveguide or a hollow dual ridge waveguide to a transverse electromagnetic (TEM) mode of a coaxial waveguide.

Example 20 is a device as in any of Examples 1-19, wherein each of the hollow waveguide port, the two or more coaxial waveguide ports, and the transition is constructed with metal additive manufacturing techniques and comprises a single combined unit.

Example 21 is a device as in any of Examples 1-20, wherein the transition comprises an impedance transition area.

Example 22 is a device as in any of Examples 1-21, wherein the impedance transition area further performs a power split or power combination.

Example 23 is a device as in any of Examples 1-22, wherein at least one of the two or more coaxial waveguide ports comprises a single wire coaxial metal conductor with one of a rectangular or a circular geometry.

Example 24 is a device as in any of Examples 1-23, wherein the two or more coaxial waveguide ports are spaced apart from one another such that the spacing between the two or more coaxial waveguide ports is less than or equal to one wavelength of the working frequency of an antenna array.

Example 25 is a device as in any of Examples 1-24, further comprising an electronic scan comprising a spacing of radiating elements less than half of a wavelength of the working frequency of the antenna array.

Example 26 is a device as in any of Examples 1-25, further comprising a hollow single ridge waveguide.

Example 27 is a device as in any of Examples 1-26, further comprising a hollow dual ridge waveguide.

Example 28 is a device as in any of Examples 1-27, wherein the two or more coaxial waveguide ports are offset relative to one another by about 90 degrees.

Example 29 is a device as in any of Examples 1-28, wherein the two or more coaxial waveguide port inner conductors each comprise a helical shape.

Example 30 is a device as in any of Examples 1-29, wherein the transition comprises one or more impedance matching steps.

Example 31 is a device as in any of Examples 1-30, wherein the transition comprises one or more impedance tapers.

Example 32 is a device as in any of Examples 1-31, wherein the transition is formed by metal additive manufacturing techniques (i.e., three-dimensional metal printing).

Example 33 is a device as in any of Examples 1-32, wherein the transition is constructed of metal using metal additive manufacturing with a direction of growth over time in a positive z-axis relative to a build plate.

Example 34 is a device as in any of Examples 1-33, wherein the device comprises an overhang angle measured between two vectors originating from any point on a surface of the device, wherein the two vectors comprise: a vector perpendicular to the surface and pointing into air volume, and a vector pointing in a negative z-axis relative to the build plate; wherein the overhang angle is from zero degrees to ninety degrees.

Example 35 is an antenna assembly including a plurality of, any or all, the devices described in any of Examples 1-34 arranged in a combiner network.

Example 36 is an antenna assembly as in Example 35, further comprising one or more coaxial ports.

Example 37 is an assembly. The assembly includes a waveguide transition device comprising two or more coaxial waveguides. The antenna assembly includes a radiating component comprising two or more radiating elements configured to receive or transmit electromagnetic energy through two or more signal ears, wherein each of the two or more signal ears is in communication with a coaxial waveguide of the two or more coaxial waveguides.

Example 38 is an assembly as in Example 37, wherein the assembly comprises: a first radiating component connected to a first waveguide transition device; and a second radiating component connected to a second waveguide transition device; wherein the first radiating component is a nearest-neighbor to the second radiating component within an antenna array; and wherein the two or more radiating elements of the first radiating component are orthogonal to the two or more radiating elements of the second radiating component.

Example 39 is an assembly as in any of Examples 37-38, wherein the assembly is an antenna array comprising a plurality of waveguide transition devices and a plurality of radiating components, and wherein the two or more signal ears of each of the plurality of radiating components comprises a grounding portion and a signal portion, and wherein the grounding portion is physically connected to a corresponding waveguide transition device.

Example 40 is an assembly as in any of Examples 37-39, wherein the antenna array is arranged such that two or more signal portions associated with two or more independent radiating components are pointed toward one another to form a signal ear grouping.

Example 41 is an assembly as in any of Examples 37-40, wherein the signal ear grouping is arranged such that the two or more signal portions associated with the two or more independent radiating components are touching one another.

Example 42 is an assembly as in any of Examples 37-41, wherein the signal ear grouping is arranged such that the two or more signal portions associated with the two or more independent radiating components are not touching one another and form a capacitive gap between the two or more signal portions.

Example 43 is an assembly as in any of Examples 37-42, wherein the radiating component is constructed of a single piece of metal by metal additive manufacturing such that the radiating component is built in a positive z-axis direction relative to a build plate.

Example 44 is an assembly as in any of Examples 37-43, wherein the waveguide transition device is constructed of a single piece of metal by metal additive manufacturing such that the waveguide transition device is built in a positive z-axis direction relative to a build plate.

Example 45 is an assembly as in any of Examples 37-44, wherein the waveguide transition device comprises: a waveguide port; the two or more coaxial waveguides; and an impedance transition disposed between the waveguide port and the two or more coaxial waveguides, wherein the impedance transition combines or divides electromagnetic radiation propagating through the waveguide transition device.

Example 46 is an assembly as in any of Examples 37-45, wherein the assembly receives or transmits the electromagnetic energy based on a direction of the electromagnetic energy propagating through the assembly, and wherein: the waveguide transition device combines the electromagnetic energy propagating from the two or more coaxial waveguides through the impedance transition to the waveguide port; and the waveguide transition device divides the electromagnetic energy propagating from the waveguide port through the impedance transition to the two or more coaxial waveguides.

Example 47 is an assembly as in any of Examples 37-46, wherein the assembly is an antenna array comprising a plurality of waveguide transition devices and a plurality of radiating components, and wherein the antenna array is arranged with a plurality of rows, and wherein each row of the plurality of rows comprises two or more waveguide transition devices and two or more radiating components.

Example 48 is an assembly as in any of Examples 37-47, wherein the plurality of rows comprises a first row and a second row, and wherein: the first row transmits or receives the electromagnetic radiation at a first orientation; the second row transmits or receives the electromagnetic radiation at a second orientation; and the first orientation is orthogonal to the second orientation such that polarization of an electromagnetic wave transmitted or received by the first row is orthogonal to polarization of an electromagnetic wave transmitted or received by the second row.

Example 49 is an assembly as in any of Examples 37-48, wherein: the two or more radiating elements associated with each of the two or more radiating components in the first row comprise the first orientation; and the two or more radiating elements associated with each of the two or more radiating components in the second row comprise the second orientation.

Example 50 is an assembly as in any of Examples 37-49, wherein: the two or more waveguide transition devices in the first row comprise a hollow dual-ridge waveguide to dual twin-wire balanced coaxial waveguide; and the two or more waveguide transition devices in the second row comprise a hollow dual-ridge waveguide to dual twin-wire balanced coaxial waveguide with a helical twist twin-wire coaxial waveguide.

Example 51 is an assembly as in any of Examples 37-50, wherein the helical twist in the two or more waveguide transition devices cause a propagation orientation of the electromagnetic energy to rotate 90 degrees such that the two or more waveguide transition devices in the second row transmit or receive the electromagnetic energy at an orientation orthogonal to the electromagnetic energy transmitted or received by the two or more waveguide transition devices in the first row.

Example 52 is an assembly as in any of Examples 37-51, wherein the assembly is an antenna array comprising a plurality of waveguide transition devices and a plurality of radiating components, and wherein the antenna array is arranged such that any of the two or more signal ears of the plurality of radiating components are spaced apart from one another with spacing less than or equal to 1.0 wavelengths of the working frequency.

Example 53 is an assembly as in any of Examples 37-52, wherein the assembly is an antenna array comprising a plurality of waveguide transition devices and a plurality of radiating components, and wherein the antenna array is arranged such that the two or more coaxial waveguides of a waveguide transition device are spaced apart from one another with spacing less than or equal to 1.0 wavelengths of the working frequency.

Example 54 is an assembly as in any of Examples 37-53, wherein at least one of the two or more coaxial waveguides comprises: one or more inner conductors; and an outer conductor encompassing the one or more inner conductors.

Example 55 is an assembly as in any of Examples 37-54, wherein the waveguide transition device comprises a surface, and wherein the surface of the waveguide transition device comprises an overhang angle measured between two vectors originating from any point on the surface of the waveguide transition device, and wherein the two vectors comprise: a vector perpendicular to the surface and pointing into air volume; and a vector pointing in a negative z-axis relative to a build plate; wherein the overhang angle is greater than or equal to 35 degrees.

Example 56 is an assembly as in any of Examples 37-55, wherein the waveguide transition device comprises one or more downward-facing surfaces relative to the build plate, and wherein each of the one or more downward-facing surfaces of the waveguide transition device comprises the overhang angle, and wherein the overhang angle is optimized for metal additive manufacturing.

Example 57 is an assembly as in any of Examples 37-56, wherein the radiating component further comprises one or more downward-facing surfaces relative to the build plate, and wherein each of the one or more downward-facing surfaces of the radiating component comprises the overhang angle, and wherein the overhang angle is optimized for the metal additive manufacturing.

Example 58 is an assembly as in any of Examples 37-57, wherein the waveguide transition device and the radiating component are constructed of a single piece and manufactured with metal additive manufacturing techniques.

Example 59 is an assembly as in any of Examples 37-58, wherein the assembly is an antenna array comprising a plurality of waveguide transition devices and a plurality of radiating components, and wherein the assembly further comprises a plurality of capacitive gaps between the plurality of radiating components, and wherein the plurality of capacitive gaps optimize the antenna array for a broad frequency bandwidth of operation.

Example 60 is an assembly as in any of Examples 37-59, wherein the assembly is an antenna array comprising a plurality of waveguide transition devices and a plurality of radiating components, and wherein the antenna array is dual polarized, and wherein the assembly further comprises a combiner network.

Example 61 is an assembly as in any of Examples 37-60, wherein the waveguide transition device is the device described in any of Examples 1-34.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. An assembly comprising:

a waveguide transition device comprising two or more coaxial waveguides; and a radiating component comprising:

two or more radiating elements configured to receive or transmit electromagnetic energy, wherein each of the two or more radiating elements comprises two or more ears;

wherein, for each of the two or more radiating elements, a first ear of the two or more ears is a signal ear;

wherein, for each of the two or more radiating elements, a second ear of the two or more ears is a signal ear or a grounded ear; and wherein each of the two or more ears of each of the two or more radiating elements is in communication with a coaxial waveguide of the two or more coaxial waveguides.

2. The assembly of claim 1, wherein the assembly comprises:

a first radiating component connected to a first waveguide transition device; and a second radiating component connected to a second waveguide transition device;

wherein the first radiating component is a nearest-neighbor to the second radiating component within an antenna array; and wherein the two or more radiating elements of the first radiating component are orthogonal to the two or more radiating elements of the second radiating component.

3. The assembly of claim 1, wherein the assembly is an antenna array comprising a plurality of waveguide transition devices and a plurality of radiating components, and wherein the two or more ears of each of the plurality of radiating components comprises a grounding portion and a signal portion, and wherein the grounding portion is physically connected to a corresponding waveguide transition device.

4. The assembly of claim 3, wherein the antenna array is arranged such that two or more signal portions associated with two or more independent radiating components are pointed toward one another to form a signal ear grouping.

5. The assembly of claim 4, wherein the signal ear grouping is arranged such that the two or more signal portions associated with the two or more independent radiating components are touching one another.

6. The assembly of claim 4, wherein the signal ear grouping is arranged such that the two or more signal portions associated with the two or more independent radiating components are not touching one another and form a capacitive gap between the two or more signal portions.

7. The assembly of claim 1, wherein the radiating component is constructed of a single piece of metal by metal additive manufacturing such that the radiating component is built in a positive z-axis direction relative to a build plate.

8. The assembly of claim 1, wherein the waveguide transition device is constructed of a single piece of metal by metal additive manufacturing such that the waveguide transition device is built in a positive z-axis direction relative to a build plate.

9. The assembly of claim 1, wherein the waveguide transition device comprises:

a waveguide port;

the two or more coaxial waveguides; and an impedance transition disposed between the waveguide port and the two or more coaxial waveguides, wherein the impedance transition combines or divides electromagnetic radiation propagating through the waveguide transition device.

10. The assembly of claim 9, wherein the assembly receives or transmits the electromagnetic energy based on a direction of the electromagnetic energy propagating through the assembly, and wherein:

the waveguide transition device combines the electromagnetic energy propagating from the two or more coaxial waveguides through the impedance transition to the waveguide port; and the waveguide transition device divides the electromagnetic energy propagating from the waveguide port through the impedance transition to the two or more coaxial waveguides.

11. The assembly of claim 1, wherein the assembly is an antenna array comprising a plurality of waveguide transition devices and a plurality of radiating components, and wherein the antenna array is arranged with a plurality of rows, and wherein each row of the plurality of rows comprises two or more waveguide transition devices and two or more radiating components.

12. The assembly of claim 11, wherein the plurality of rows comprises a first row and a second row, and wherein:

the first row transmits or receives the electromagnetic radiation at a first orientation;

the second row transmits or receives the electromagnetic radiation at a second orientation; and the first orientation is orthogonal to the second orientation such that polarization of an electromagnetic wave transmitted or received by the first row is orthogonal to polarization of an electromagnetic wave transmitted or received by the second row.

13. The assembly of claim 12, wherein:

the two or more radiating elements associated with each of the two or more radiating components in the first row comprise the first orientation; and the two or more radiating elements associated with each of the two or more radiating components in the second row comprise the second orientation.

14. The assembly of claim 13, wherein:

the two or more waveguide transition devices in the first row comprise a hollow dual-ridge waveguide to dual twin-wire balanced coaxial waveguide; and the two or more waveguide transition devices in the second row comprise a hollow dual-ridge waveguide to dual twin-wire balanced coaxial waveguide with a helical twist twin-wire coaxial waveguide.

15. The assembly of claim 14, wherein the helical twist in the two or more waveguide transition devices cause a propagation orientation of the electromagnetic energy to rotate 90 degrees such that the two or more waveguide transition devices in the second row transmit or receive the electromagnetic energy at an orientation orthogonal to the electromagnetic energy transmitted or received by the two or more waveguide transition devices in the first row.

16. The assembly of claim 1, wherein the assembly is an antenna array comprising a plurality of waveguide transition devices and a plurality of radiating components, and wherein the antenna array is arranged such that any of the two or more ears of the plurality of radiating components are spaced apart from one another with spacing less than or equal to 1.0 wavelengths of a working frequency of the assembly.

17. The assembly of claim 1, wherein the assembly is an antenna array comprising a plurality of waveguide transition devices and a plurality of radiating components, and wherein the antenna array is arranged such that the two or more coaxial waveguides of a waveguide transition device are spaced apart from one another with spacing less than or equal to 1.0 wavelengths of a working frequency of the assembly.

18. The assembly of claim 1, wherein at least one of the two or more coaxial waveguides comprises:

one or more inner conductors; and an outer conductor encompassing the one or more inner conductors.

19. The assembly of claim 1, wherein the waveguide transition device comprises a surface, and wherein the surface of the waveguide transition device comprises an overhang angle measured between two vectors originating from any point on the surface of the waveguide transition device, and wherein the two vectors comprise:

a vector perpendicular to the surface and pointing into air volume; and a vector pointing in a negative z-axis relative to a build plate;

wherein the overhang angle is greater than or equal to 35 degrees.

20. The assembly of claim 19, wherein the waveguide transition device comprises one or more downward-facing surfaces relative to the build plate, and wherein each of the one or more downward-facing surfaces of the waveguide transition device comprises the overhang angle, and wherein the overhang angle is optimized for metal additive manufacturing.

21. The assembly of claim 20, wherein the radiating component further comprises one or more downward-facing surfaces relative to the build plate, and wherein each of the one or more downward-facing surfaces of the radiating component comprises the overhang angle, and wherein the overhang angle is optimized for the metal additive manufacturing.

22. The assembly of claim 21, wherein the waveguide transition device and the radiating component are constructed of a single piece and manufactured with metal additive manufacturing techniques.

23. The assembly of claim 1, wherein the assembly is an antenna array comprising a plurality of waveguide transition devices and a plurality of radiating components, and wherein the assembly further comprises a plurality of capacitive gaps between the plurality of radiating components, and wherein the plurality of capacitive gaps optimize the antenna array for a broad frequency bandwidth of operation.

24. The assembly of claim 1, wherein the assembly is an antenna array comprising a plurality of waveguide transition devices and a plurality of radiating components, and wherein the antenna array is dual polarized, and wherein the assembly further comprises a combiner network.

* * * * *